United States Patent
Gromes, Sr. et al.

(10) Patent No.: US 11,789,471 B2
(45) Date of Patent: *Oct. 17, 2023

(54) METHOD OF CLEANING HEAT EXCHANGERS OR TUBE BUNDLES USING A CLEANING STATION

(71) Applicant: Terydon, Inc., Navarre, OH (US)

(72) Inventors: Terry D. Gromes, Sr., Navarre, OH (US); Terry D. Gromes, Jr., Navarre, OH (US); Kristen E. Griffin, Navarre, OH (US); Jon M. Shockey, Jr., Canton, OH (US); Gordon W. East, North Canton, OH (US); William C. Jackson, Cleveland, OH (US)

(73) Assignee: TERYDON, INC., Navarre, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,467

(22) Filed: May 9, 2022

(65) Prior Publication Data

US 2022/0261014 A1 Aug. 18, 2022

Related U.S. Application Data

(63) Continuation of application No. 17/071,203, filed on Oct. 15, 2020, now Pat. No. 11,360,494, which is a (Continued)

(51) Int. Cl.
*G05D 7/06* (2006.01)
*B24C 7/00* (2006.01)
(Continued)

(52) U.S. Cl.
CPC .......... *G05D 7/0617* (2013.01); *B24C 3/327* (2013.01); *B24C 7/0015* (2013.01); *F28G 1/163* (2013.01);
(Continued)

(58) Field of Classification Search
None
See application file for complete search history.

(56) References Cited

U.S. PATENT DOCUMENTS 3,354,490 A 11/1967 Masters
3,665,608 A 5/1972 Stockebrand
(Continued)

FOREIGN PATENT DOCUMENTS

CN 100500308 C 6/2009
CN 201828811 U 5/2011
(Continued)

OTHER PUBLICATIONS

Topcon introduces X-22 wireless excavator control system, www.equipmentworld.com/topcon-introduces-x-22-wireless-excavator-control-system/, Annotated, Equipment World Staff, Oct. 28, 2011, 4 pages.
(Continued)

*Primary Examiner* — Christopher W Fulton
(74) *Attorney, Agent, or Firm* — SAND, SEBOLT & WERNOW CO., LPA

(57) ABSTRACT

A system, apparatus and method of cleaning tubes of a heat exchanger or a tube bundle that includes disengaging the heat exchanger or bundle from a use-position in a process or a plant; moving the heat exchanger or bundle to a cleaning station remote from the use-position; positioning the heat exchanger or tube bundle in front of a cleaning apparatus; providing water jet cleaning equipment on the cleaning apparatus; responding to programming in a computing device and controlling the water jet cleaning equipment and a cleaning operation; providing a pattern of tube openings defined in an end plate of the heat exchanger or bundle to the computing device; actuating the water jet cleaning equipment with the computing device; and manually or automatically performing a cleaning operation with the water jet
(Continued)

cleaning equipment under control of the programming of the computing device and by following the provided pattern of tube openings.

20 Claims, 8 Drawing Sheets

Related U.S. Application Data continuation-in-part of application No. 16/942,945, filed on Jul. 30, 2020, now Pat. No. 11,294,399, which is a continuation-in-part of application No. 16/265,387, filed on Feb. 1, 2019, now Pat. No. 10,747,238, which is a continuation of application No. 16/155,340, filed on Oct. 9, 2018, now Pat. No. 10,599,162, which is a continuation of application No. 15/689,483, filed on Aug. 29, 2017, now Pat. No. 10,401,878, said application No. 16/155,340 is a continuation of application No. 15/689,572, filed on Aug. 29, 2017, now Pat. No. 10,408,552, said application No. 15/689,483 is a continuation-in-part of application No. 14/204,265, filed on Mar. 11, 2014, now Pat. No. 10,265,834, said application No. 15/689,483 is a continuation-in-part of application No. 14/204,350, filed on Mar. 11, 2014, now Pat. No. 10,040,169, said application No. 15/689,483 is a continuation-in-part of application No. 14/204,451, filed on Mar. 11, 2014, now abandoned.

(60) Provisional application No. 62/381,390, filed on Aug. 30, 2016, provisional application No. 61/821,433, filed on May 9, 2013.

(51) Int. Cl.
*G06F 3/04886* (2022.01)
*B24C 3/32* (2006.01)
*F28G 15/00* (2006.01)
*F28G 15/02* (2006.01)
*F28G 15/08* (2006.01)
*F28G 1/16* (2006.01)
*F28D 7/16* (2006.01)

(52) U.S. Cl.
CPC ........... *F28G 15/003* (2013.01); *F28G 15/02* (2013.01); *F28G 15/08* (2013.01); *G06F 3/04886* (2013.01); *F28D 7/16* (2013.01)

(56) References Cited

U.S. PATENT DOCUMENTS

| | | | |
|---|---|---|---|
| 3,794,051 A | 2/1974 | Lee et al. | |
| 3,821,498 A | 6/1974 | Shaefer, Jr. et al. | |
| 3,901,252 A | 8/1975 | Riebe | |
| 3,903,912 A | 9/1975 | Ice, Jr. et al. | |
| 4,001,556 A | 1/1977 | Folchi et al. | |
| 4,229,136 A | 10/1980 | Panissidi | |
| 4,367,790 A | 1/1983 | Draeger | |
| 4,379,335 A | 4/1983 | Kirsch et al. | |
| 4,380,796 A | 4/1983 | Ostby | |
| 4,437,201 A | 3/1984 | Zalewski | |
| 4,527,515 A | 7/1985 | Hester, II | |
| 4,716,611 A | 1/1988 | Barry | |
| 4,760,859 A | 8/1988 | Brown | |
| 4,773,357 A | 9/1988 | Scharton et al. | |
| 4,813,146 A | 3/1989 | Jaluzot | |
| 4,918,817 A | 4/1990 | Eaton | |
| 5,092,193 A | 3/1992 | Yanagisawa | |
| 5,148,600 A | 9/1992 | Chen et al. | |
| 5,276,970 A | 1/1994 | Wilcox et al. | |
| 5,570,660 A | 11/1996 | Vandenberg | |
| 5,838,882 A | 11/1998 | Gan et al. | |
| 5,954,494 A | 9/1999 | Goldsmith et al. | |
| 6,232,736 B1 | 5/2001 | Bullen | |
| 6,457,792 B1 | 10/2002 | Saund et al. | |
| 6,681,839 B1 | 1/2004 | Balzer | |
| 6,877,930 B2 | 4/2005 | Stromdahl et al. | |
| 7,228,125 B2 | 6/2007 | Adachi et al. | |
| 7,846,260 B2 | 12/2010 | Jiang et al. | |
| 8,057,607 B2 | 11/2011 | Gardner et al. | |
| 8,078,297 B2 | 12/2011 | Lasher et al. | |
| 8,195,344 B2 | 6/2012 | Song et al. | |
| 8,308,869 B2 | 11/2012 | Gardner | |
| 8,524,011 B2 | 9/2013 | Gardner | |
| 8,612,641 B1 | 12/2013 | Bozarth et al. | |
| 8,646,416 B2 | 2/2014 | Hawkins et al. | |
| 8,676,390 B2 | 3/2014 | Berry et al. | |
| 8,978,276 B2 | 3/2015 | Moon, Jr. et al. | |
| 9,062,921 B2 | 6/2015 | Gromes, Sr. et al. | |
| 9,328,979 B2 | 5/2016 | Brumfield | |
| 9,363,220 B2 | 6/2016 | Ubillos et al. | |
| 9,605,915 B2 | 3/2017 | Crock | |
| 9,851,164 B2 | 12/2017 | Hand et al. | |
| 9,939,215 B2 | 4/2018 | Gzym et al. | |
| 10,024,613 B2 | 7/2018 | Mathis | |
| 10,401,878 B2 | 9/2019 | Gromes, Sr. et al. | |
| 10,408,552 B2 | 9/2019 | Gromes, Sr. et al. | |
| 10,502,509 B2 | 12/2019 | Brumfield | |
| 10,514,217 B2 | 12/2019 | Wall et al. | |
| 10,599,162 B2 | 3/2020 | Gromes, Sr. et al. | |
| 10,747,238 B2 | 8/2020 | Gromes, Sr | |
| 10,890,390 B2 | 1/2021 | Gromes, Sr. et al. | |
| 11,248,860 B2 | 2/2022 | Schneider et al. | |
| 11,294,399 B2 | 4/2022 | Gromes, Sr. et al. | |
| 11,300,981 B2 | 4/2022 | Gromes, Sr. et al. | |
| 11,460,258 B2 | 10/2022 | Brumfield | |
| 2003/0065424 A1 | 4/2003 | Erichsen et al. | |
| 2003/0147727 A1 | 8/2003 | Fujishima et al. | |
| 2003/0202091 A1 | 10/2003 | Garcia et al. | |
| 2004/0035445 A1 | 2/2004 | Saxon et al. | |
| 2004/0069331 A1 | 4/2004 | Garman et al. | |
| 2004/0093850 A1 | 5/2004 | Horii et al. | |
| 2004/0182842 A1 | 9/2004 | Denney et al. | |
| 2005/0196314 A1 | 9/2005 | Petersen et al. | |
| 2006/0090622 A1 | 5/2006 | Adkins | |
| 2006/0196576 A1 | 9/2006 | Fleming et al. | |
| 2006/0212203 A1 | 9/2006 | Furuno | |
| 2006/0249185 A1 | 11/2006 | Garman | |
| 2008/0062140 A1 | 3/2008 | Hotelling et al. | |
| 2008/0175569 A1 | 7/2008 | Johnson | |
| 2008/0185126 A1 | 8/2008 | Jiang et al. | |
| 2008/0204426 A1 | 8/2008 | Hotelling et al. | |
| 2008/0282583 A1 | 11/2008 | Koellner et al. | |
| 2009/0097502 A1 | 4/2009 | Yamamoto | |
| 2010/0062697 A1 | 3/2010 | Vedsted | |
| 2010/0095559 A1 | 4/2010 | Buckner | |
| 2010/0185364 A1 | 7/2010 | McClure | |
| 2010/0186971 A1 | 7/2010 | Seyffert | |
| 2010/0313451 A1 | 12/2010 | Trubiano | |
| 2011/0186657 A1 | 8/2011 | Haviland | |
| 2011/0287692 A1 | 11/2011 | Erichsen et al. | |
| 2011/0301755 A1 | 12/2011 | Anderson | |
| 2011/0315164 A1 | 12/2011 | DesOrmeaux | |
| 2012/0007885 A1 | 1/2012 | Huston | |
| 2012/0024321 A1 | 2/2012 | Hays | |
| 2012/0061108 A1 | 3/2012 | Cerrano | |
| 2012/0067370 A1 | 3/2012 | Crock et al. | |
| 2012/0229662 A1 | 9/2012 | Lankalapalli et al. | |
| 2012/0330449 A1 | 12/2012 | Edwards et al. | |
| 2013/0030589 A1 | 1/2013 | Pessina et al. | |
| 2013/0033090 A1 | 2/2013 | Jokonya | |
| 2013/0042894 A1 | 2/2013 | Gromes, Sr. | |
| 2013/0167697 A1 | 7/2013 | Reukers | |
| 2013/0245835 A1 | 9/2013 | Watanabe | |
| 2013/0271004 A1 | 10/2013 | Min et al. | |
| 2014/0014141 A1 | 1/2014 | Watson | |
| 2014/0045409 A1 | 2/2014 | Zhang et al. | |
| 2014/0046477 A1 | 2/2014 | Brahan et al. | |
| 2015/0034128 A1 | 2/2015 | Brumfield | |

(56) References Cited

U.S. PATENT DOCUMENTS

| | | |
|---|---|---|
| 2015/0065114 A1 | 3/2015 | Dua |
| 2015/0068563 A1 | 5/2015 | Gzym et al. |
| 2015/0204768 A1 | 7/2015 | Newman |
| 2015/0258694 A1 | 9/2015 | Hand et al. |
| 2015/0379785 A1 | 12/2015 | Brown, Jr. et al. |
| 2016/0025433 A1 | 1/2016 | Mathis |
| 2016/0243597 A1 | 8/2016 | Shawver |
| 2017/0102195 A1 | 4/2017 | Watkins |
| 2017/0108300 A1 | 4/2017 | Brumfield |
| 2017/0348931 A1 | 12/2017 | Yuzer et al. |
| 2018/0281030 A1 | 10/2018 | Eisemann et al. |
| 2018/0292151 A1 | 10/2018 | Mathis |
| 2019/0041877 A1 | 2/2019 | Gromes, Sr. et al. |
| 2019/0163207 A1 | 5/2019 | Gromes, Sr. et al. |
| 2019/0346866 A1 | 11/2019 | Gromes, Sr. et al. |
| 2019/0353437 A1 | 11/2019 | Gromes, Sr. et al. |
| 2020/0166957 A1 | 5/2020 | Gromes, Sr. et al. |
| 2020/0166958 A1 | 5/2020 | Gromes, Sr. et al. |
| 2020/0356117 A1 | 11/2020 | Gromes, Sr. et al. |
| 2020/0356118 A1 | 11/2020 | Gromes, Sr. et al. |
| 2021/0026379 A1 | 1/2021 | Gromes, Sr. et al. |
| 2021/0207903 A1 | 7/2021 | Gromes, Sr. et al. |

FOREIGN PATENT DOCUMENTS

| | | |
|---|---|---|
| CN | 203250208 U | 10/2013 |
| CN | 203837569 U | 9/2014 |
| CN | 104181867 A | 12/2014 |
| CN | 104440896 | 3/2015 |
| DE | 3426889 | 5/1985 |
| DE | 102014104356 | 10/2015 |
| EP | 0569080 | 11/1993 |
| EP | 0803697 | 10/1997 |
| EP | 1669711 A1 | 6/2006 |
| FR | 2563331 | 10/1985 |
| WO | 0111303 | 2/2001 |
| WO | 2009131512 | 10/2009 |
| WO | 2016037197 | 3/2016 |
| WO | 2020086873 | 4/2020 |

OTHER PUBLICATIONS

WardJet Brochure, X-Classic Controller, 2012, 3 pages.
Operation Manual Sabertooth Air Powered Dual Hose Reel StoneAge, StoneAge Waterblast Tools, (Sep. 1, 2010), pp. 1-7, XP055762268.
Operation Manual Sabertooth Air Powered Dual Hose Reel StoneAge. 2010.
Spong, et al. Robot Dynamics and Control. 2nd Edition p. 9,1.1, pp. 13-22, 1.3.1-1.3.6; Jan. 28, 2004.
Shawver. How Automated Water Jetting Improves Tube Bundle Cleaning Efficiency. 2011 WJTA—IMCA Conference and Expo. Sep. 2011. Houston, TX.
Video Stutes Enterprise Live Demo—2013 WJTA—IMCA Conference & Expo (https://www.youtube.com/watch?v=zoCFoopM yU).
Video Peinemann Equipment Live Demo—2013 WJTA—IMCA Conference & Expo Sep. 11, 2013 (https://www.youtube.com/watch?v=GPa2w65ZNkE).
Video Veolia Diamondback(https://www.youtube.com/watch?v=8tAZwctqneQ); Feb. 13, 2014.

METHOD OF CLEANING HEAT EXCHANGERS OR TUBE BUNDLES USING A CLEANING STATION

CROSS-REFERENCE TO RELATED APPLICATIONS

This is a Continuation of U.S. patent application Ser. No. 17/071,203, filed Oct. 15, 2020, now U.S. Pat. No. 11,360,494; which is a Continuation-in-Part of U.S. patent application Ser. No. 16/942,945, filed Jul. 30, 2020, now U.S. Pat. No. 11,294,399; which is a Continuation-in-Part of U.S. patent application Ser. No. 16/265,387 filed Feb. 1, 2019, now U.S. Pat. No. 10,747,238; which is a Continuation of U.S. patent application Ser. No. 16/155,340 filed Oct. 9, 2018, now U.S. Pat. No. 10,599,162; which is a Continuation of U.S. patent application Ser. No. 15/689,483 filed Aug. 29, 2017, now U.S. Pat. No. 10,401,878; which claims the benefit of U.S. Provisional Patent Application Ser. No. 62/381,390, filed Aug. 30, 2016.

U.S. patent application Ser. No. 16/155,340 filed Oct. 9, 2018, now U.S. Pat. No. 10,599,162, is a Continuation of U.S. patent application Ser. No. 15/689,572, filed Aug. 29, 2017, now U.S. Pat. No. 10,408,552, which claims the benefit of U.S. Provisional Patent Application Ser. No. 62/381,390, filed Aug. 30, 2016.

U.S. patent application Ser. No. 15/689,483 filed Aug. 29, 2017, now U.S. Pat. No. 10,401,878, is a Continuation-in-Part of U.S. patent application Ser. No. 14/204,265 filed Mar. 11, 2014, now U.S. Pat. No. 10,265,834, which claims the benefit of U.S. Provisional Patent Application Ser. No. 61/821,433 filed May 9, 2013.

U.S. patent application Ser. No. 15/689,483 filed Aug. 29, 2017, now U.S. Pat. No. 10,401,878, is also a Continuation-in-Part of U.S. patent application Ser. No. 14/204,350 filed Mar. 11, 2014, now U.S. Pat. No. 10,040,169, which claims the benefit of U.S. Provisional Patent Application Ser. No. 61/821,433 filed May 9, 2013.

U.S. patent application Ser. No. 15/689,483 filed Aug. 29, 2017, now U.S. Pat. No. 10,401,878, is also a Continuation-in-Part of U.S. patent application Ser. No. 14/204,451, filed Mar. 11, 2014, now abandoned, which claims the benefit of U.S. Provisional Patent Application Ser. No. 61/821,433 filed May 9, 2013.

The entire disclosures of the above-listed applications are all incorporated herein by reference.

TECHNICAL FIELD

The present disclosure is directed generally to equipment and a method of cleaning heat exchanger tubes. More particularly, the disclosure relates to a water-jet cleaning system and a method of setting up and operating the same using a smart indexing controller. Specifically, the disclosure is directed to a system, apparatus, and method for cleaning heat exchangers that includes disengaging the heat exchanger or tube bundle from where it is used in a process in a plant and moving the heat exchanger to a permanent cleaning station located remote from where the heat exchanger is located during use. At the cleaning station, water jet cleaning equipment is permanently set up and is operable by an operator using a computing device programmed with specialized programming which controls the water jet cleaning equipment and controls the cleaning operation. After cleaning, the heat exchanger or tube bundle is returned to the location where it is used in a process.

BACKGROUND

Background Information

Heat exchangers typically include a tube bundle, i.e., a plurality of individual tubes that are operably engaged with each other and are encased in a cylindrical outer shell. An end of each tube terminates in an end plate that is secured to the tubes. The tube bundle is inserted into the bore of the outer shell and rim or flange secures the end plate to the shell. The end plate defines a plurality of openings therein and each of these openings permits access to the bore of one of the tubes in the tube bundle.

After a heat exchanger has been used for some time the bores of the heat exchanger tubes tend to become partially or completely blocked with material deposited therein by steam travelling through the tubes. It becomes necessary to clean this accumulated material from the tube bores from time to time so that the heat exchanger continues to operate efficiently. The typical way of cleaning these tube bores is by bringing water jet cleaning equipment to the location of the heat exchanger in the plant or factory. The water jet cleaning equipment is actuated to direct a high pressure fluid-jet into the bore of each tube in the heat exchanger and blast away the built-up materials. After the heat exchanger is cleaned, the water jet cleaning equipment is removed from proximate the heat exchanger, and the heat exchanger is put back into use.

Heat exchangers are used in various processes in different types of plants. In some of these processes and plants, it is only needful to clean the heat exchangers every few months or even only once a year. In other settings, however, it is necessary to clean the heat exchangers frequently, possibly once or twice every week, or two. Moving and setting up water jet cleaning equipment this frequently is labor intensive and time consuming. This is particularly true in processes or plants, such as in chemical processes or plants, where multiple heat exchangers may be utilized in the process.

One of the issues when cleaning heat exchanger tubes with a high pressure water-jet is that the high-pressure stream of water has to be directed accurately into the opening of each tube. If the water-jet is not in the correct location relative to the perimeter of the opening in the end plate, not only will the tube fail to be scoured clean of built-up material but the water-jet may be deflected through contacting part of the end plate surrounding the tube opening. The deflected water-jet may seriously injure the operator of the water jet cleaning equipment or cause damage to other objects in the vicinity of the heat exchanger simply because of the pressure under which the water is being delivered through the lances/nozzles on the cleaning system. The tubes in a heat exchanger tube bundle are typically arranged in such a manner that the openings in the end plate tend to form a pattern. The pattern and spacing of these openings tends to vary from one heat exchanger to another. Additionally, the diameters of the openings in the end plates (and the diameters of the tubes in the shell) may vary from one heat exchanger to the next. It is therefore problematic to have to repeatedly set up water-jet cleaning equipment so that it is able to accurately direct a water jet into the tube openings of any particular heat exchanger. In the past, a substantial amount of time-consuming manual adjustment was necessary to repeatedly set up a cleaning system to make sure that the tubes of different heat exchangers would all be adequately cleaned.

SUMMARY

The cleaning system, cleaning apparatus, and method disclosed herein is designed to make it relatively quick and easy to set up and clean multiple heat exchangers in an efficient and safe manner.

A system, an apparatus and a method of cleaning tubes of a heat exchanger or a tube bundle of a heat exchanger is disclosed herein. The method includes disengaging the heat exchanger or tube bundle from a use-position in a process or a plant; moving the heat exchanger or tube bundle to a cleaning station remote from the use-position; positioning the heat exchanger or tube bundle in front of a cleaning apparatus at the cleaning station; providing water jet cleaning equipment on the cleaning apparatus; responding to programming in a computing device (where the computing device is part of the cleaning apparatus, or is a hand-held device such as a tablet or smartphone, or the computing device is in a location remote from the plant or cleaning station). The programming in the computing device is configured to control the various equipment for moving the heat exchanger or tube bundle, and for controlling the water jet cleaning equipment and other equipment necessary to make the water jet cleaning equipment function. The programming is used to perform a cleaning operation using the water jet equipment. The method includes providing a pattern of tube openings defined in an end plate of the heat exchanger or the tube bundle to the computing device; actuating the water jet cleaning equipment or associated equipment with the computing device; and manually or automatically performing a cleaning operation with the water jet cleaning equipment under control of the programming of the computing device and by following the provided pattern of tube openings. The computing device is operated by an operator who is able to control the cleaning operation in real time using the computing device. Alternatively, the operator is able to initiate an automatic cleaning of the heat exchanger or tube bundle using the computing device. The computing device may include a deadmans switch that is substantially continuously contacted by the operator. Releasing the deadmans switch will automatically shut down the water jet cleaning equipment and the cleaning operation. The operator is able to activate pumps and valves at the cleaning station or in related equipment, where the pumps and valves are operatively engaged with the water jet cleaning equipment and with the delivery of a high pressure jet of cleaning fluid during performance of a cleaning operation.

In one aspect, an exemplary embodiment of the present disclosure may provide a method of cleaning tubes of a heat exchanger comprising disengaging a heat exchanger or a tube bundle from a use-position in a process or a plant; moving the heat exchanger or the tube bundle to a cleaning station remote from the use-position; positioning the heat exchanger or the tube bundle in front of a cleaning apparatus at the cleaning station; providing water jet cleaning equipment on a support assembly of the cleaning apparatus; responding to programming in a computing device and controlling the water jet cleaning equipment and a cleaning operation using the water jet cleaning equipment; providing a pattern of tube openings defined in an end plate of the heat exchanger or the tube bundle to the computing device; actuating the water jet cleaning equipment with the computing device; and performing a cleaning operation of the heat exchanger with the water jet cleaning equipment under control of the programming of the computing device and by following the provided pattern of tube openings.

In another aspect, an exemplary embodiment of the present disclosure may provide a cleaning station for cleaning heat exchanger or tube bundles comprising a cleaning apparatus provided at a location remote from a heat exchanger that is to be cleaned, wherein the cleaning apparatus includes a support assembly; water jet cleaning equipment substantially permanently mounted on the support assembly, wherein said water jet cleaning equipment is adapted to be operatively engaged with a supply of cleaning fluid, and wherein said water jet cleaning equipment is configured to deliver a high pressure jet of cleaning fluid therefrom; and a computing device provided with programming to control the water jet cleaning equipment and to control a performance of a cleaning operation with the water jet cleaning equipment; wherein the programming of the computing device is adapted to control the cleaning operation of the heat exchanger once the heat exchanger has been moved from the remote location to proximate the cleaning apparatus.

In one embodiment, the programming of the computing device may be configured to learn a pattern of tube openings to tubes provided in the heat exchanger or the tube bundle and to control a lance of the water jet cleaning equipment to follow the learned pattern. In one embodiment, the cleaning station may further comprise a pattern of tube openings to tubes in the heat exchanger or the tube bundle provided to or stored in the computing device, wherein the programming of the computing device may be configured to control a lance of the water jet cleaning equipment to follow the provided or stored pattern. In one embodiment, the programming in the computing device may be configured to move a lance of the water jet cleaning equipment along one or both of an X-axis and a Y-axis. In one embodiment, the programming in the computing device may be configured to move a lance of the water jet cleaning equipment along a rotary path. In one embodiment, the programming in the computing device may be configured to move a lance of the water jet cleaning equipment along one or more of an X-axis, a Y-axis, and a Z-axis.

In one embodiment, the cleaning station further comprises a user interface provided on the computing device; wherein the user interface includes a touch screen; and a plurality of selectable options provided on the user interface, wherein at least one of the plurality of selectable options corresponds to a function to be performed by a component of the water jet cleaning apparatus; and wherein one or more movements of a fingertip of a human operator on the at least one of the plurality of selectable options on the touch screen controls one of the cleaning operation of the water jet cleaning apparatus and the performing of the cleaning operation with the water jet cleaning apparatus; wherein the programming is configured to learn a pattern of a plurality of spaced apart openings in an end plate of a heat exchanger; and wherein the programming is configured to move a nozzle of an indexer from one of the plurality of spaced apart openings in the pattern to another of the plurality of spaced apart openings upon fingertip contact with one of the plurality of selectable options on the touch screen.

In one embodiment, a lance of the water jet cleaning equipment may be operatively engaged with the support assembly and is adapted to be connected to a remote water source. In one embodiment, the lance may have at least a first degree of freedom and a second degree of freedom relative to the support assembly; and the programming in the computing device may be operable to control movement of the lance relative to the support assembly. In one embodiment, the first degree of freedom may be rotation of the lance about an axis oriented at right angles to a mounting plate secured to the support assembly. In one embodiment, the second degree of freedom may be linear motion of the lance in one of a first direction towards the mounting plate and a second direction away from the mounting plate.

In another aspect, and exemplary embodiment of the present disclosure may provide a system for cleaning one or more heat exchangers or tube bundles, said system comprising a cleaning station provided at a location remote from a plant or process utilizing the one or more heat exchangers or tube bundles; a cleaning apparatus provided at the cleaning station, said cleaning apparatus comprising a support assembly; water jet cleaning equipment substantially permanently mounted on the support assembly, wherein said water jet cleaning equipment is adapted to be operatively engaged with a supply of cleaning fluid, and wherein said water jet cleaning equipment is configured to deliver a high pressure jet of cleaning fluid therefrom; a computing device provided with programming to control the water jet cleaning equipment and to control a performance of a cleaning operation using the water jet cleaning equipment; and at least one transportation device configured to move the one or more heat exchangers or tube bundles from the remote location to the cleaning station, and, after the cleaning operation has been performed, to move the one or more multiple heat exchangers back to the remote location.

In one embodiment, the system further includes a pattern of tube openings defined in an end plate of each of the one or more heat exchangers and tube bundles provided to the computing device; wherein the programming controls the performance of the cleaning operation by moving one or more lances of the water jet equipment according to the pattern of tube openings. In one embodiment, the programming in the computing device may be configured to move a lance of the water jet cleaning equipment along one or both of an X-axis and a Y-axis. In one embodiment, the programming in the computing device may be configured to move a lance of the water jet cleaning equipment along a rotary path. In one embodiment, the programming in the computing device may be configured to move a lance of the water jet cleaning equipment along one or more of an X-axis, a Y-axis, and a Z-axis.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
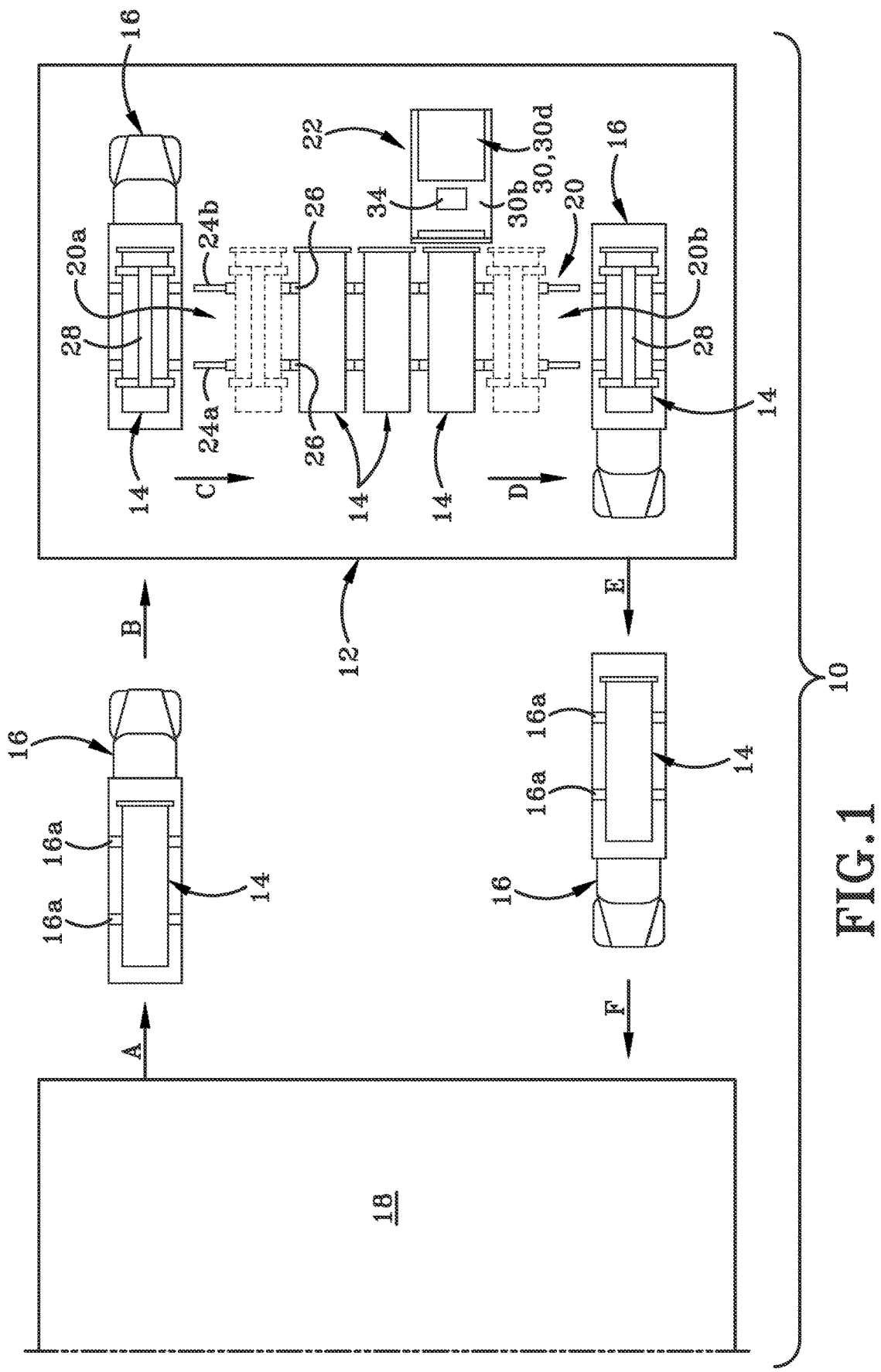
FIG. 1 is a diagrammatic top plan view of a first embodiment of a system, apparatus and method for cleaning heat exchangers or tube bundles utilizing a permanent cleaning station located a distance from a plant where the heat exchanger or tube bundle is typically used.

Referring to FIG. 1 there is shown a diagrammatic top plan view of a first embodiment of a system, method, and apparatus in accordance with the present disclosure. The system, generally indicated at 10, includes a cleaning station 12 that is permanently set up for cleaning heat exchangers 14, at least one transportation device 16, and a plant 18 where the one or more heat exchangers 14 are typically used in a process of some type. For example, the plant 18 may be a chemical plant that utilizes heat exchangers 14 in a chemical process, and because of the chemical process in which the heat exchangers 14 are used, the tubes in the heat exchanger tubes may need to be cleaned frequently. For example, the tubes of the heat exchanger 2 14 need to be cleaned frequently, e.g. every few days or every week or two.

Cleaning station 12 may be provided in the same facility as the plant 18. Alternatively, cleaning station 12 may be provided at another location that is not in the same facility as the plant 18 but is close enough for it to make economic sense for heat exchangers 14 (or the tube bundles thereof) to be disconnected from their typical use-positions and taken to the cleaning station 12 for cleaning. (In other words, the heat exchangers 14 are moved to the cleaning station 12 instead of water jet cleaning equipment being brought to the plant 18 and cleaning the heat exchangers 14 in situ.)

Although not illustrated herein, it will be understood that the heat exchangers 14 utilized in system 10 preferably are operatively engaged in the process/machinery of plant 18 utilizing a quick connect/disconnect mechanism. In some instances, the entire heat exchanger 14 (i.e., outer shell with the tube bundle engaged therein) may be disengaged from its use-position and moved to the cleaning station 12. In other instances, the tube bundle and end plate may be removed from inside the outer shell of the heat exchanger 14 and only the tube bundle with attached end plate will be moved to the cleaning station 12. It will be understood that in the following description the term "heat exchanger" should be understood to mean either the entire heat exchanger or only the tube bundle and end plate.

As mentioned above, system 10 includes one or more transportation devices 16 that move the heat exchanger 14 between plant 18 and cleaning station 12. In some instances, the transportation device 16 is capable of moving the entire heat exchanger 14 or the extracted tube bundle and end plate between plant 18 and cleaning station 12. In other instances, the transportation device 16 itself is capable of extracting the heat exchanger or the tube bundle and end plate and then moving the heat exchanger or tube bundle and attached end plate between the plant 18 and cleaning station 12.

In FIG. 1, transportation device 16 is represented as a flatbed truck. The truck is diagrammatically represented as being equipped with a cradle 16a which will effectively support and retain a single heat exchanger 14 thereon. It will be understood that cradle 16a, because it is designed to adequately support and retain heat exchanger 14 thereon, is configured to be complementary to the heat exchanger 14 it designed to hold. Since heat exchangers 14 typically include a generally cylindrical outer shell, it will be understood that cradle 16a may be generally U-shaped when viewed from the rear end of the truck. Heat exchanger 14 will be seated in the U-shaped arms or support base of the U-shaped cradle 16a.

In other embodiments, transportation device 16 may be a specially designed, dedicated vehicle that's sole purpose is extracting and transporting heat exchangers 14. In this dedicated vehicle, the cradle 16a may include a mechanism that is capable of pivoting and/or being raised or lowered relative to the truck bed. The cradle 16a may further include a forklift type mechanism that may be utilized to extract a heat exchanger from its use-position in a plant or process, or may be utilized to replace a heat exchanger into its use-position in the plant or process.

Cleaning station 12, as illustrated in FIGS. 1 and 2A through 3B, includes a translation assembly 20 for supporting and/or moving a plurality of heat exchangers 14. Cleaning station 12 further includes a cleaning apparatus 22 that is located proximate a portion of the translation assembly 20 and is oriented at right angles to translation assembly 20. The translation assembly 20 includes an input end 20a and an output end 20b and the cleaning station 22 is located somewhere along the translation assembly 20 between the input and output ends 20a, 20b. Translation assembly 20 is illustrated as including a pair of laterally spaced-apart rails 24a, 24b. (It will be understood that in other embodiments only one rail may be provided and in other instances more than two rails will be provided.) Rails 24a, 24b are mounted on a platform 24c (FIG. 2A) that is located a distance above the ground surface "S". A conveyor mechanism 26 is operatively engaged with the rails 24a, 24b and is configured to receive and hold one or more heat exchangers 14 thereon. Platform 24c is provided so that heat exchangers 14 on the translation assembly 20 are held at a desired height "H" off the ground surface "S". Raising heat exchangers 14 the height "H" off the ground surface "S" helps to ensure that an operator "P" is better able to observe a cleaning operation in progress from cleaning apparatus 22 without unnecessary discomfort or strain. It will be understood that in other embodiments, the platform 24c may be omitted from the translation assembly 20. The conveyor mechanism 26 may include any suitable type of heavy-duty conveyor capable of holding and moving one or more heat exchanger 14 thereon.

Translation assembly 20 may further include a suitable lifting mechanism for lifting a dirty heat exchanger 14 off transportation device 16 and onto the conveyor mechanism 26 and for lifting a cleaned heat exchanger 14 off the conveyor mechanism 26 and placing it back onto transportation device 16. One suitable lifting mechanism is a gantry crane. In FIG. 1, for example, a portion of a hoist mechanism 28 for a gantry crane is shown engaged with a dirty heat exchanger 14 at the input end 20a of the translation assembly 20. Another portion of a hoist mechanism 28 for a gantry crane is shown engaged with a cleaned heat exchanger 14 at the output end 20b of the translation assembly 20. It will be understood that in other instances, the transportation device 16, itself, will include a lifting mechanism for the heat exchanger and therefore a lifting mechanism will not be required as part of the translation assembly 20.

During use of system 10 a dirty heat exchanger 14 is removed a use-position in the plant 18 and, as indicated by arrow "A", is loaded onto transportation device 16. Transportation device 16 moves in the direction indicated by arrow "B" to input end 20a of translation assembly 20 where the dirty heat exchanger 14 is unloaded onto conveyor 26 of translation assembly 20. Conveyor 26 of translation assembly 20 progressively moves the dirty heat exchanger 14 from input end 20a towards a cleaning position directly in front of the cleaning apparatus 22. This is indicated by arrow "C". Once the dirty heat exchanger 14 is in the cleaning position directly in front of cleaning apparatus 22, the cleaning apparatus 22 is activated and a cleaning operation is initiated. (This will be further described later herein.) Heat exchanger 14 is thoroughly cleaned by cleaning apparatus 22 while being supported on conveyor 26. As soon as the cleaning operation is over, conveyor 26 is activated to move the cleaned heat exchanger 14 towards the output end 20b of translation assembly 20 as indicated by arrow "D". At output end 20b, the cleaned heat exchanger 14 is lifted off conveyor 26 and loaded back onto transportation device 16. Transportation device 16 moves in the direction of arrow "E" back to the plant 18. At the plant 18, the cleaned heat exchanger 14 is removed from the transportation device 16, as indicated by arrow "F", and is reinstalled in its associated use-position. Heat exchanger 14 is then available for use once again in the process performed by the plant 18.

As illustrated in FIG. 1, multiple heat exchangers 14 may be stacked on translation assembly 20 and be progressively moved to the cleaning position in front of the cleaning apparatus 22 and then on to the output end 20b of translation assembly for progressive removal and transportation back to the plant 18. This arrangement makes for more efficient and economical cleaning operation of multiple heat exchangers 14.

It will be understood that, in some embodiments, a cradle component of lifting mechanism 28 may be left in engagement with each heat exchanger 14 as that heat exchanger is moved through system 10. In other words, the cradle component is engaged with the dirty heat exchanger 14 at some point between being extracted at the plant 18 and being lifted off transportation device 16 and onto the translation assembly 20. For example, the cradle component may be engaged with the dirty heat exchanger 14 when the same is placed onto the transportation device 16 and is then removed from the heat exchanger 14 once cleaned and after the heat exchanger 14 is loaded back onto the transportation device 16. Alternatively, the cradle component may only be removed once the cleaned heat exchanger 14 is delivered back to the plant 18. Still further, the cradle component may only be engaged with the dirty heat exchanger when it arrives on the transportation device 16 at the input end 20a of the translation assembly 20.

Figure 1A:
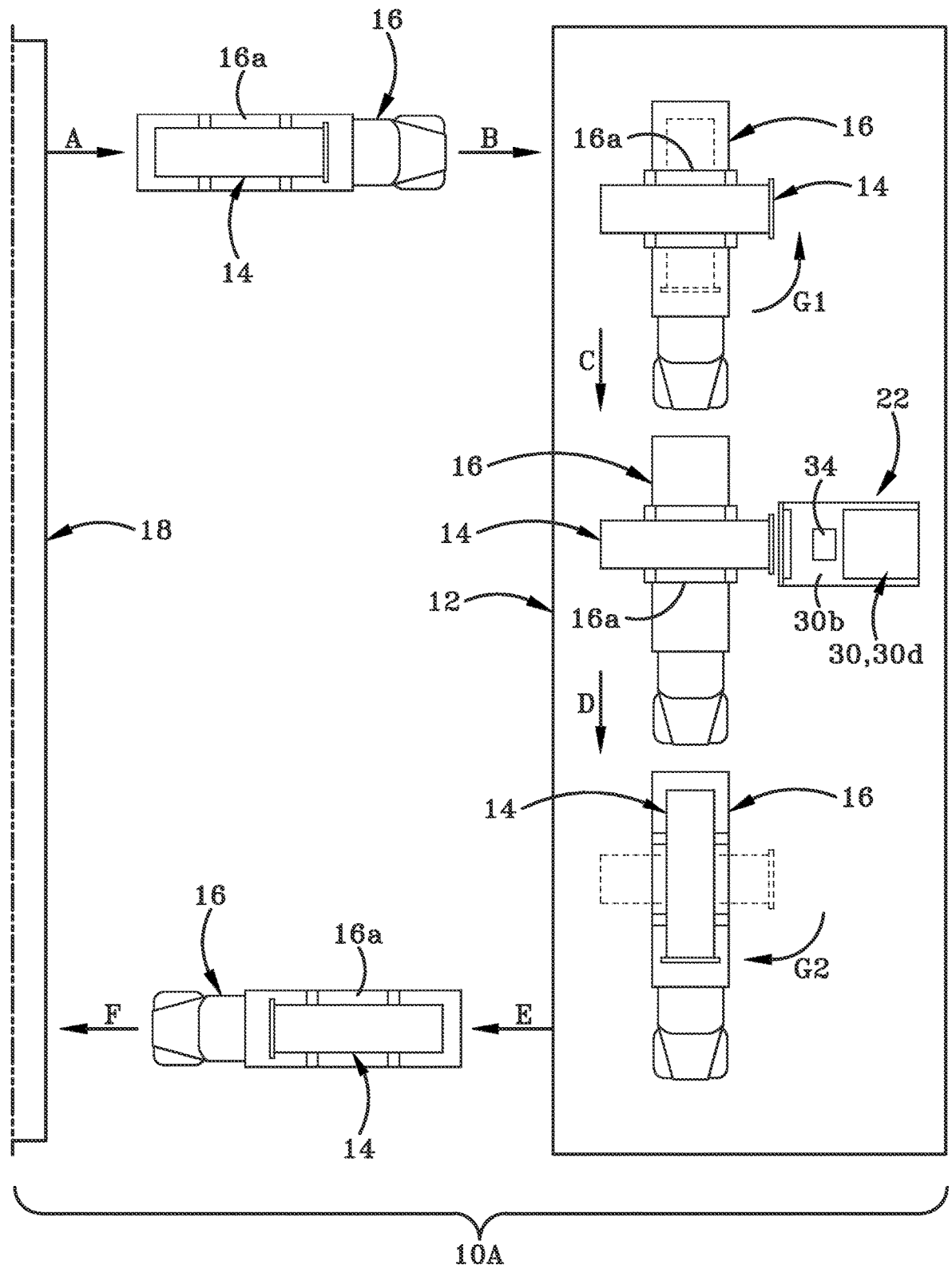
FIG. 1A is a diagrammatic top plan view of a second embodiment of a system, apparatus, and method for cleaning heat exchangers or tube bundles utilizing a permanent cleaning station located a distance from a plant where the heat exchanger or tube bundle is typically used.

FIG. 1A shows a second embodiment system 10A where a different type of transportation device 16 is utilized and the translation assembly is omitted from the system. In this instance, the transportation device 16 is capable of extracting a dirty heat exchanger 14 (or tube bundle and end plate) from plant 18 (as shown by arrow "A"), the transportation device 16 moves toward the cleaning station as indicated by arrows "B" and "C" and is itself positioned at the cleaning position in front of cleaning apparatus 22. Before transportation device 16 reaches (or when it reaches) the cleaning position, transportation device 16 rotates heat exchanger 14 through 90° as indicated by arrow "G1" so that the heat exchanger is in the correct orientation to be cleaned by cleaning apparatus 22. After heat exchanger 14 is cleaned, the transportation device 16 rotates heat exchanger 14 through 90° once again so that heat exchanger 14 is aligned with a longitudinal axis of transportation device 16 once again. This second rotation of heat exchanger 14 is indicated by arrow "G2". Transportation device 16 moves back toward plant 18 as indicated by arrow "E" and then the cleaned heat exchanger 14 is removed from transportation device 16 and is installed back in its use-position in plant 18 (indicated by arrow "F").

Referring now to FIGS. 2A through 3B, an exemplary first embodiment of a cleaning apparatus 22 is illustrated. Cleaning apparatus 22 comprises a frame 30 that includes a base 30a which stands on the ground surface "S". The base 30a may be fixedly secured to the ground surface "S" by anchor bolts, for example, or may simply rest upon ground surface "S". In yet other embodiments, a plurality of wheels may be provided on base 30a to allow the cleaning apparatus 22 to be moved across the ground surface "S". The frame 30 includes a platform 30b that is retained a distance above the base 30a by a plurality of beams 30c. A cab 30d is provided on platform 30b. Cab 30d includes a control station 30e and a seat 30f for the operator "P" to sit on adjacent to the control station 30e. Control station 30e includes a computing device 32 including a display screen 32a and a user interface 32b.

Platform 30b extends outwardly beyond cab 30d in one or more directions and various components of the cleaning apparatus 22 may be provided on platform 30b or other parts of frame 30. By way of example only, a hose reel assembly 34 is provided on platform 30b. A first hose 36 extends between hose reel assembly 36 and a remote water source 38. A second hose 40 extends between hose reel assembly 36 and water jet cleaning equipment 42 that is substantially permanently installed on cleaning apparatus 22 on a support assembly 30g that is part of frame 30. Support assembly 30 is utilized to secure water jet cleaning equipment 42 to cleaning apparatus 22 in a correct position in order to effectively clean heat exchanger tube 14. Support assembly 30g extends upwardly beyond the upper surface of platform 30b and is provided forwardly with respect to cab 30d and proximate a front end of the platform 30b. As illustrated, support assembly 30g comprises laterally spaced apart vertical members 30h, 30h' that extend upwardly from platform 30b. A horizontal member 30h" extends between upper ends of the vertical members 30h, 30h'. Strengthening plates 30j are provided where vertical members 30h, 30h' connect to platform 30b and to horizontal member 30h". It will be understood that the illustrated frame 30 and support assembly 30g are exemplary only and that any other suitable frame and support assembly may be provided cleaning apparatus.

Figure 2A:
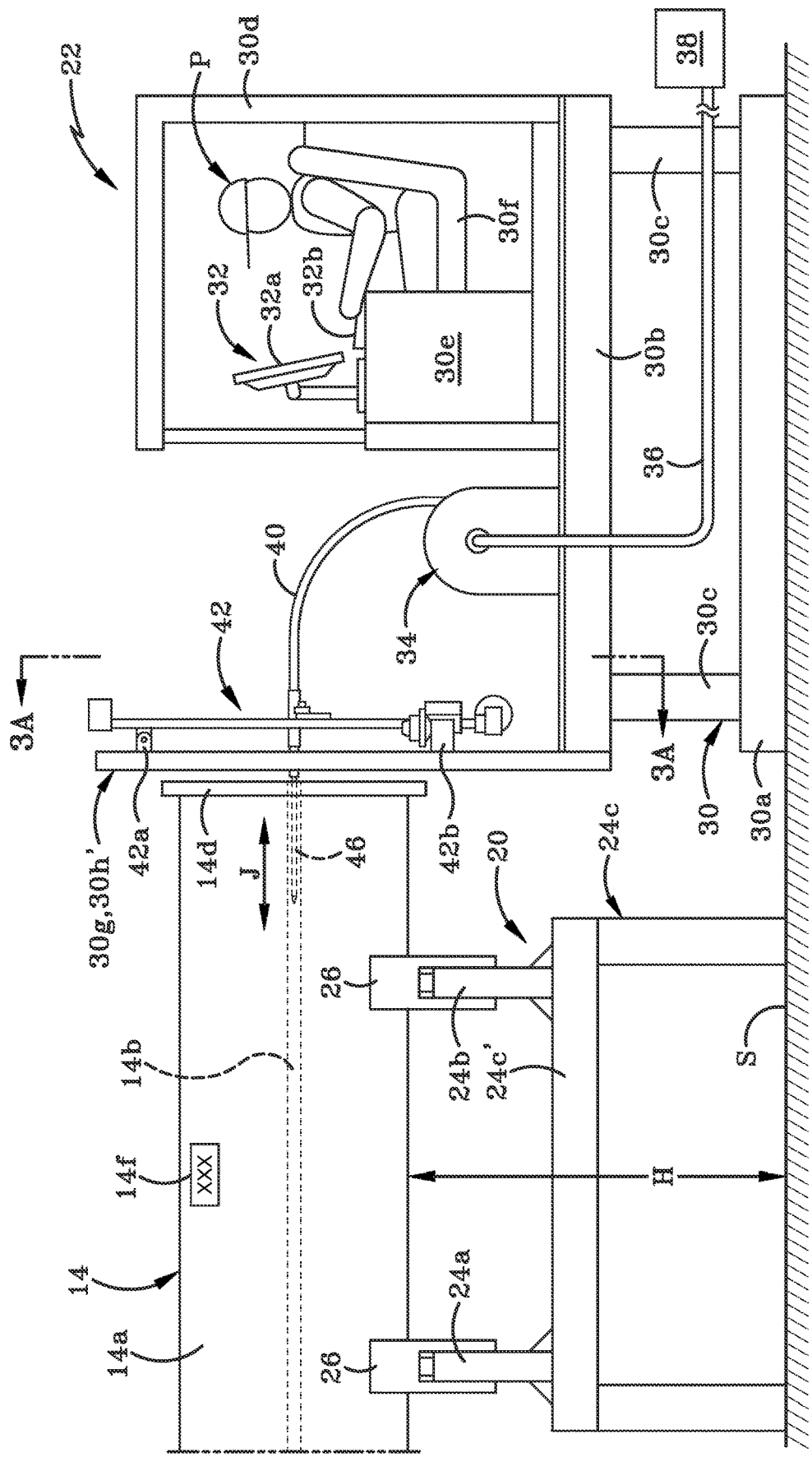
FIG. 2A is a diagrammatic side elevation view showing the cleaning apparatus of FIG. 1 being used to clean a heat exchanger and showing an operator seated in a cab of the cleaning apparatus and controlling a cleaning operation using water jet cleaning equipment provided on the cleaning apparatus using a computing device.
Figure 3A:
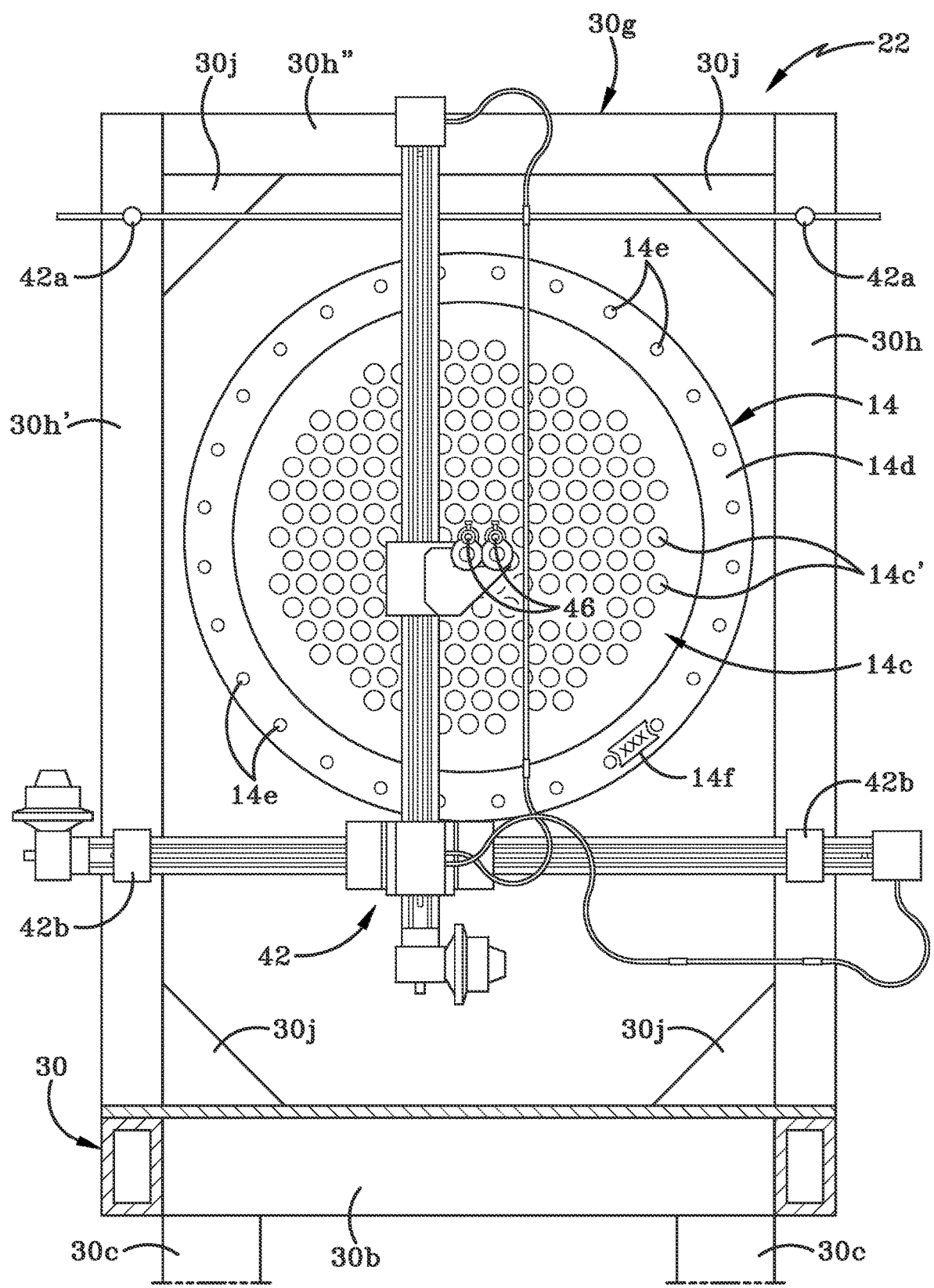
FIG. 3A is a rear elevation view of an exemplary first embodiment of the water jet cleaning equipment provided on the cleaning apparatus, where the view is taken along line 3A-3A of FIG. 2A.

As is well known in the art and has been discussed earlier herein, heat exchanger 14 includes a cylindrical outer shell 14a that defines a bore therethrough. A plurality of tubes are arranged in a bundle and the bundle is received in the bore of outer shell 14a. A single tube 14b of the tube bundle is illustrated in FIG. 2A. Each tube 14b in the tube bundle terminates in an end plate 14c (FIG. 3A). The bores of the various tubes in the tube bundle are accessible through openings 14c' defined in the end plate 14c. A connector ring 14d is utilized to secure the tube bundle and attached end plate 14c within outer shell 14a. The connector ring 14d is secured to outer shell 14a by a plurality of bolts 14e.

In accordance with an aspect of the present disclosure any suitable type of water jet cleaning equipment may be substantially permanently attached to cleaning apparatus 22. For example, FIGS. 2A and 3A show a first exemplary type of water jet cleaning equipment 42 that is able to be secured by at least brackets 42a, 42b to support assembly 30g. One example of suitable water jet cleaning equipment 42 is described in U.S. Pat. No. 10,747,238 (Gromes et al.) which is incorporated herein by reference.

Water jet cleaning equipment 42 is operatively engaged with communication device 32 and/or control table 30e. This operative engagement between water jet cleaning equipment 42, communication device 32, and/or control table 30e may be wireless or hard wired. Water jet cleaning equipment 42 is also operatively engaged with the remote water source 38 via the various hoses 36, 48, and the hose reel assembly 34 (if the hose reel assembly is provided). Hose reel assembly 34 and/or water source 38 may also be operatively engaged with communication device 32, and/or control table 30e. In some embodiments, translation assembly 20 is also operatively engaged with communication device 32 and/or control table 30e. In accordance with an aspect of the present disclosure, a cleaning operation utilizing water jet cleaning equipment 42 is activated, controlled, monitored, and deactivated by the operator "P" utilizing the communication device 32 (shown in FIG. 2A) or utilizing a hand-held communication device 44 (shown in FIG. 26).

In accordance with an aspect of the present disclosure, communication device 32 or hand-held communication device 44 is provided with programming that is specially configured to activate, control, monitor, and deactivate the various pieces of equipment utilized in the performance of a cleaning operation. One suitable program uploaded into communication device 32 or hand-held communication device 44 is marketed under the tradename "THE LUNCH BOX™" (Terydon Incorporated of Navarre, Ohio, US). A range of different suitable types of water jet cleaning equipment and methods of using a wireless or hard-wired communication device 32, 44 programmed with THE LUNCH BOX™ have been disclosed and described in detail in several patents and patent applications all commonly owned by Terydon Incorporated. These applications include:

U.S. patent application Ser. No. 16/943,032, filed Jul. 30, 2020 (entitled "ROTARY TOOL WITH SMART INDEXER", now U.S. Pat. No. 11,300,981;

U.S. patent application Ser. No. 16/942,945, filed Jul. 30, 2020 (entitled "ROTARY TOOL WITH SMART INDEXING"), now U.S. Pat. No. 11,294,399;

U.S. patent application Ser. No. 16/776,770 filed Jan. 30, 2020 (entitled "INDEXER, INDEXER RETROFIT KIT AND METHOD OF USE THEREOF");

U.S. patent application Ser. No. 16/776,741, filed Jan. 30, 2020 (entitled "INDEXER, INDEXER RETROFIT KIT AND METHOD OF USE THEREOF"), now U.S. Pat. No. 11,709,507;

U.S. patent application Ser. No. 16/737,150, filed Jan. 8, 2020 (entitled "LANCE CLEANING SYSTEM WITH MOVABLE SUPPORT"), now U.S. Pat. No. 11,675,761;

U.S. patent application Ser. No. 16/524,279, filed Jul. 29, 2019 (entitled "INDEXER, INDEXER RETROFIT KIT AND METHOD OF USE THEREOF" now U.S. Pat. No. 10,890,390);

U.S. patent application Ser. No. 16/520,589, filed Jul. 24, 2019 (entitled "INDEXER, INDEXER RETROFIT KIT AND METHOD OF USE THEREOF"), now U.S. Pat. No. 11,327,511;

U.S. patent application Ser. No. 16/265,387 filed Feb. 1, 2019, now U.S. Pat. No. 10,747,238 (entitled "INDEXER, INDEXER RETROFIT KIT, AND METHOD OF USE THEREOF"), now U.S. Pat. No. 10,747,238;

U.S. patent application Ser. No. 16/155,340 filed Oct. 9, 2018, now U.S. Pat. No. 10,599,162 (entitled ""INDEXER, INDEXER RETROFIT KIT, AND METHOD OF USE THEREOF"), now U.S. Pat. No. 10,599,162;

U.S. patent application Ser. No. 15/689,572, filed Aug. 29, 2017, now U.S. Pat. No. 10,408,552 (entitled "INDEXER, INDEXER RETROFIT KIT, AND METHOD OF USE THEREOF"), now U.S. Pat. No. 10,408,552;

U.S. patent application Ser. No. 15/689,483 filed Aug. 29, 2017, now U.S. Pat. No. 10,401,878 (entitled "INDEXER, INDEXER RETROFIT KIT, AND METHOD OF USE THEREOF");

U.S. patent application Ser. No. 14/997,035, filed Jan. 15, 2016 (entitled "MECHANISM FOR REMOTELY CONTROLLING EQUIPMENT"), now abandoned;

U.S. patent application Ser. No. 14/204,554, filed Mar. 11, 2014, (entitled "METHOD AND APPARATUS FOR USING AN APPLICATION TO CONTROL OPERATION WITH A DEADMAN SWITCH"), now abandoned;

U.S. patent application Ser. No. 14/204,451, filed Mar. 11, 2014, now abandoned (entitled "MECHANISM FOR REMOTELY CONTROLLING WATER JET EQUIPMENT"), now abandoned;

U.S. patent application Ser. No. 14/204,350 filed Mar. 11, 2014, now U.S. Pat. No. 10,040,169 (entitled "SYSTEM AND METHOD FOR WIRELESS CONTROL USING A DEADMAN SWITCH");

U.S. patent application Ser. No. 14/204,265 filed Mar. 11, 2014, now U.S. Pat. No. 10,265,834 (entitled "SYSTEM FOR REMOTELY CONTROLLING AN OPERATING DEVICE");

U.S. Provisional Patent Application Ser. No. 62/381,390, filed Aug. 30, 2016 (entitled "INDEXER AND USE THEREOF); and U.S. Provisional Patent Application Ser. No. 61/821,433 filed May 9, 2013 (entitled "SYSTEM AND METHOD FOR WIRELESS CONTROL").

Figure 2B:
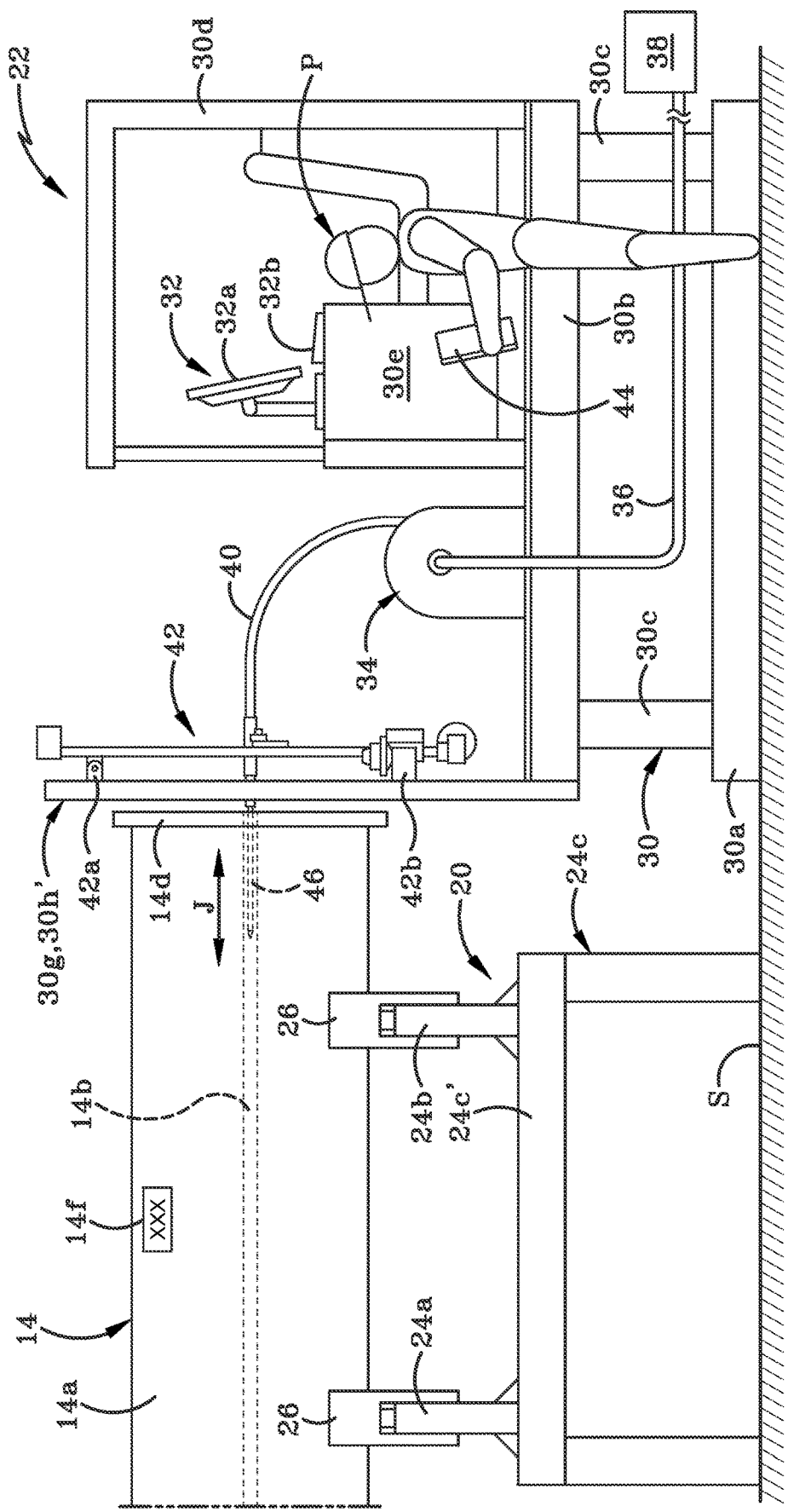
FIG. 2B is a diagrammatic side elevation view the cleaning apparatus of FIG. 1 being used to clean a heat exchanger and showing an operator standing a distance away from the cleaning apparatus and controlling a cleaning operation using the water jet cleaning equipment provided on the cleaning apparatus using a hand-held computing device.

All of the above-listed patents and patent applications are incorporated herein by reference. It will be understood that any of the water jet cleaning equipment that has been described and illustrated in the above patents and patent applications may be provided as part of the cleaning apparatus 22 shown in FIGS. 1-4B and may be operated via the communication device 32 or the communication device 44 by an operator "P" who is seated in the cab 30d (as shown in FIG. 2A) or standing adjacent the cleaning apparatus as shown in FIG. 2B.

AS discussed above, FIG. 3A, for example, shows exemplary water jet cleaning equipment 42 may be an X-Y axis indexer that is shown and described in any of the patents and patent applications identified above and entitled "INDEXER, INDEXER RETROFIT KIT AND METHOD OF USE THEREOF". In particular, suitable mounting brackets 42a (FIG. 2B) and 42b (FIG. 3A) are used to secure the arms of the X-Y indexer 42 to the support assembly 30g of cleaning apparatus 22. Once the X-Y indexer 42 is secured to support assembly 30g, the operator "P" uses the desired communication device 32 or 44 to move the one or more lances 46 (FIG. 2A, 3A) of the indexer progressively from one opening 14c' in the end plate 14c to another. The one or more lances 46 may each include a nozzle thereon and a high pressure jet of cleaning fluid (such as water) is delivered through lances 46 (and nozzles engaged therewith) and into the openings 14c' and bores of the tubes 14b. As shown in FIGS. 2A and 2B by the arrow "J", each lance 46 may be advanced into the bore of the associated heat exchanger tube 14b to progressively shoot the cleaning fluid into the same. Lance 46 is withdrawn from the tube bore when the cleaning operation is over. The high pressure jet of fluid delivered from each lance 46 scours build-up from the interior surface of the tube 14b that defines the bore thereof. In particular, water jet cleaning equipment 42 is configured to move lances 46 selectively along an X-axis and a Y-axis of a Cartesian coordinate system. The operation of the X-Y indexer and the control of the indexer and a cleaning operation therewith via programming provided in a communication device 32, 44 has been described in detail in the aforementioned incorporated patents and patent applications and will therefore not be further described herein.

Figure 3B:
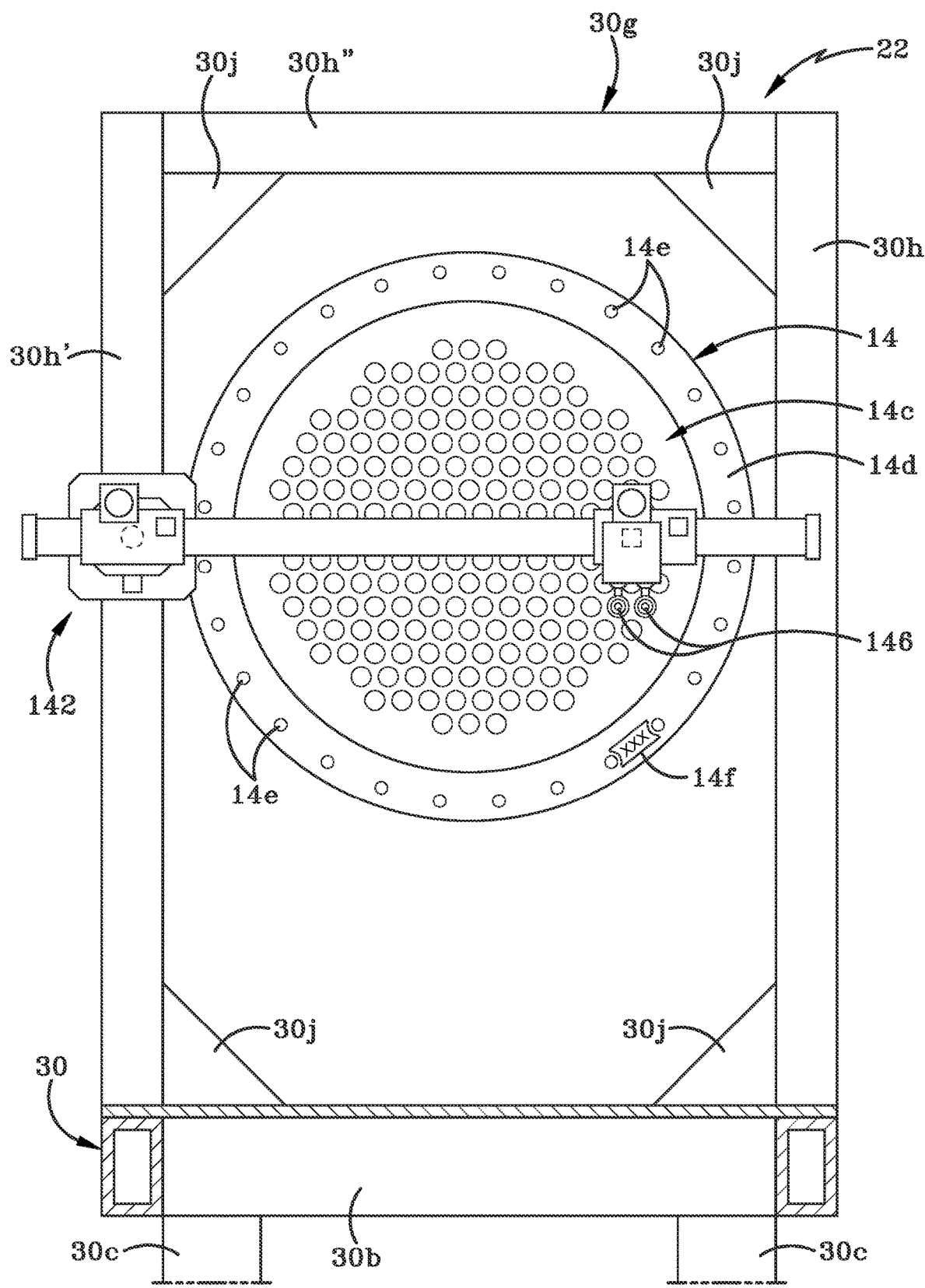
FIG. 3B is a rear elevation view of an exemplary second embodiment of the water jet cleaning equipment provided on the cleaning apparatus, where the view is taken along line 3A-3A of FIG. 2A.

FIG. 3B shows a second exemplary embodiment of water jet cleaning equipment 142 that may be engaged with the support assembly 30g of cleaning apparatus 22. In this instance, the illustrated water jet cleaning equipment 142 is an example of a number of rotary cleaning devices that may be utilized to clean tubes 14b of heat exchanger 14 using a high pressure jet of cleaning fluid delivered through lances 146. The structure and method of operation of such rotary cleaning devices 142 under the control of THE LUNCH BOX™ programming has been described in detail in a number of the patents and patent applications listed above, particularly those entitled "ROTARY TOOL WITH SMART INDEXER" and "ROTARY TOOL WITH SMART INDEXING". As a consequence, such rotary water jet cleaning equipment 142 and the control thereof will not be further described herein. It should be noted, however, that after the water jet cleaning equipment 142 has been secured to support assembly 30g by suitable mountings, the operator "P" may control a cleaning operation thereof utilizing the equipment 142 either from cab 30d using communication device 32 or when standing in the general proximity of the cleaning apparatus 22 and utilizing communication device 44.

Figure 4A:
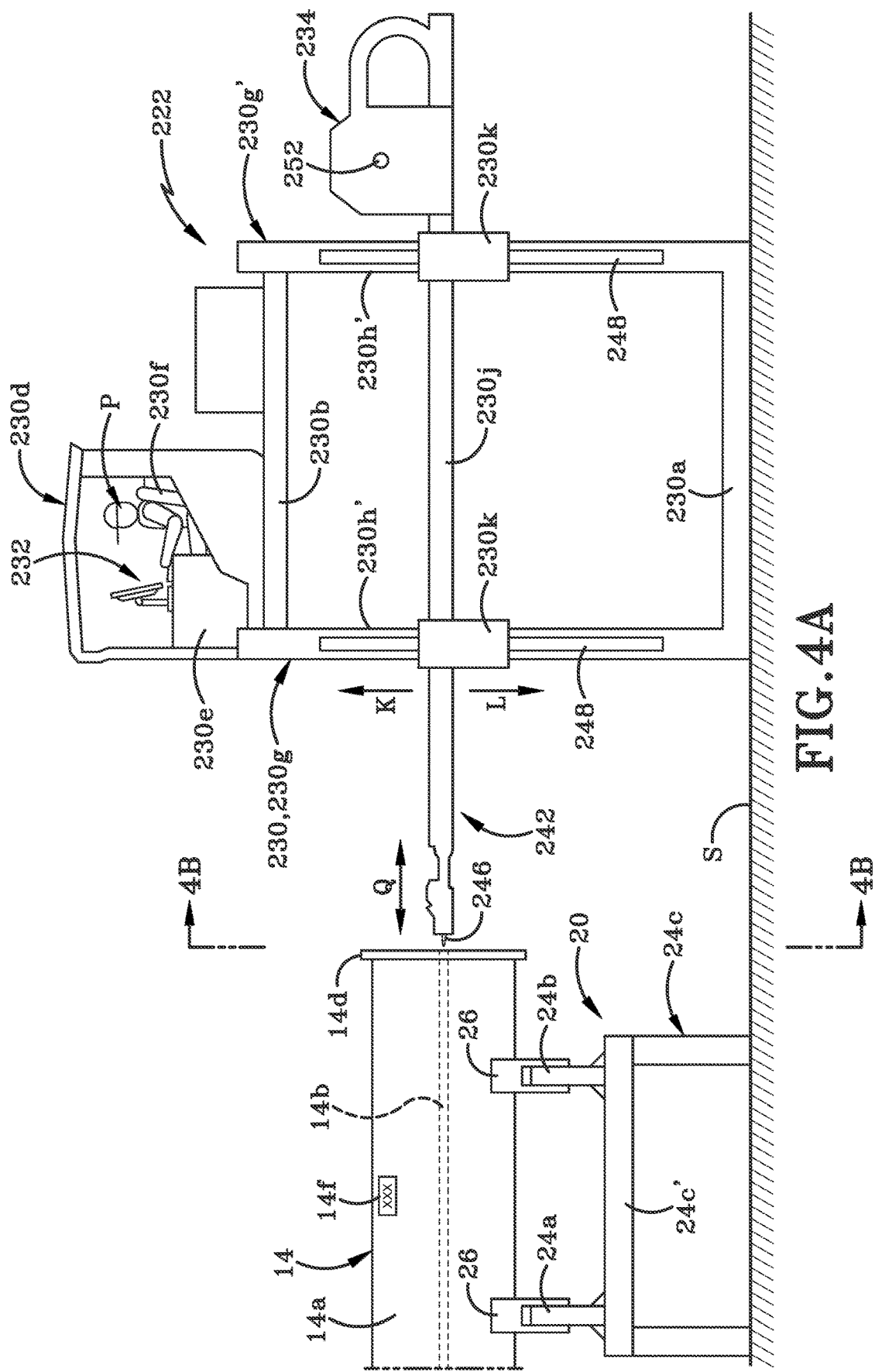
FIG. 4A is a side elevation view of an exemplary third embodiment of the water jet cleaning equipment provided on the cleaning apparatus; is a diagrammatic side elevation view showing a second embodiment of the cleaning apparatus that is provided with a third embodiment of the water jet cleaning equipment thereon; and showing an operator seated in a cab of the cleaning apparatus and controlling a cleaning operation using water jet cleaning equipment provided on the cleaning apparatus using a computing device.
Figure 4B:
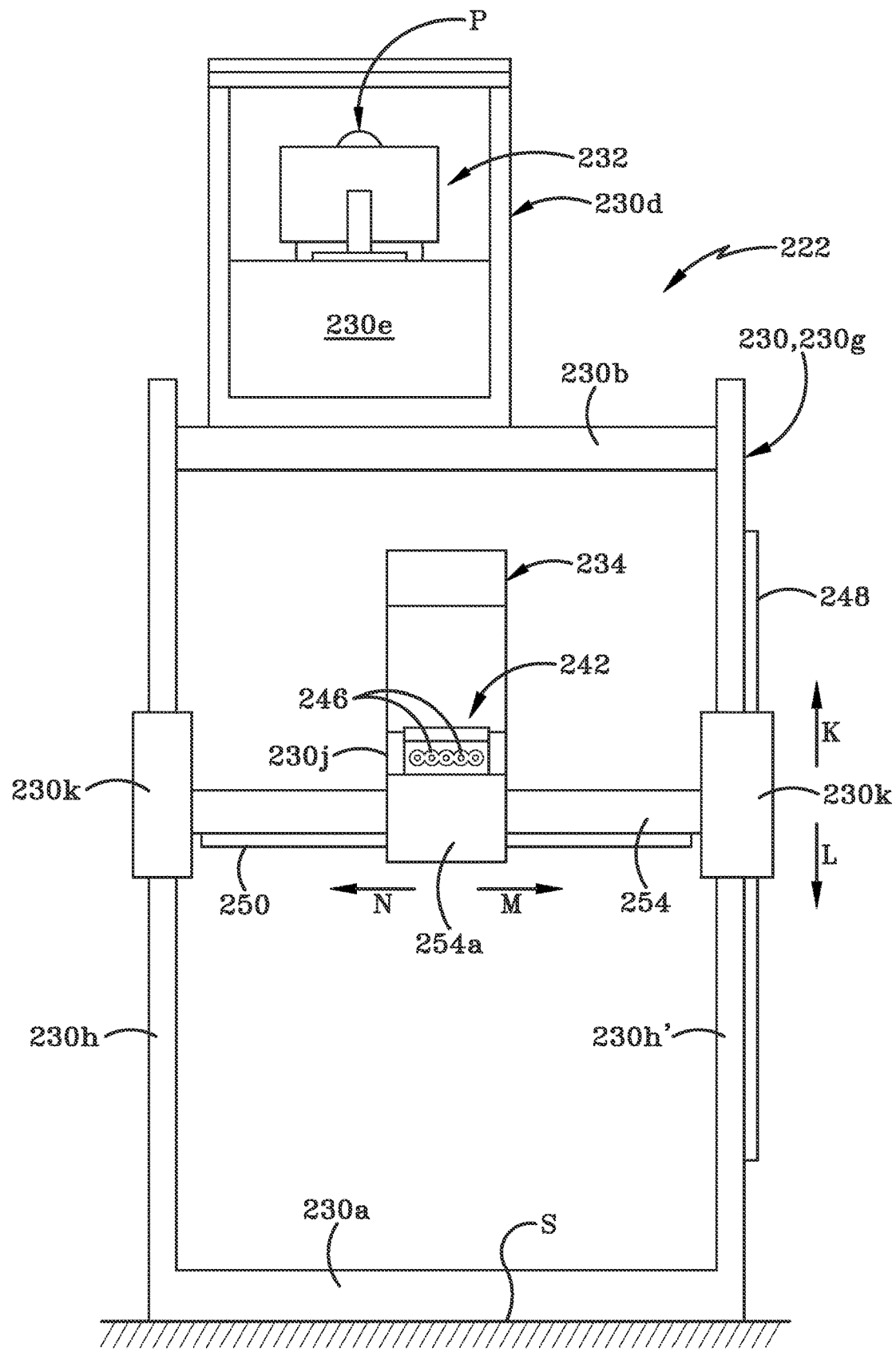
FIG. 4B is a front elevation view of the cleaning apparatus and the water jet cleaning equipment taken along line 4B-4B of FIG. 4A.

Turning now to FIGS. 4A and 4B, there is shown a second embodiment of a cleaning apparatus in accordance with the present disclosure, generally indicated at 222. The cleaning apparatus 222 is again stationary equipment similar to cleaning apparatus 22 except that the structure of the frame and the method of operation of the cleaning apparatus 222 differs somewhat from the frame and method of operation of the cleaning apparatus 22. Cleaning apparatus 222, like cleaning apparatus may be located proximate a translation assembly 20 which is used to move heat exchangers 14 progressively along the length of translation assembly 20 and to a cleaning location directly in front of the cleaning apparatus 222 (as is shown with respect to cleaning apparatus 22 and FIG. 1). Alternatively, the translation assembly may be omitted and a transportation device 16 may deliver a heat exchanger 14 directly to the cleaning position in front of cleaning apparatus 222 similar to the system illustrated in FIG. 1A with respect to cleaning apparatus 22.

The cleaning apparatus 222 includes a frame 230 having a base 230a, a fixed platform 230b that is supported a distance above base 230a. In particular frame 230 has a front support assembly 230g and a rear support assembly 230g', each of which comprises laterally spaced-apart vertical support beams 230h, 230h'. A cab 230d with a control table 230e and associated seat 230f is provided on fixed platform 230b. A communication device 232 is provided as part of control station 230e.

A movable platform 230j is provided between fixed platform 230b and base 230a. A mechanism 230k for raising or lowering movable platform 230j is provided on front and rear support assemblies 230g, 230g'. A third embodiment cleaning apparatus 242 is supported on movable platform 230j and by support assemblies 230g, 230g'. Platform 230j and support assemblies 230g, 230g' correctly position water jet cleaning equipment 242 to perform a cleaning operation on a dirty heat exchanger 14 that is moved to the cleaning position in front of cleaning apparatus 222. Water jet cleaning equipment 242 includes multiple lances 246 that are positionable adjacent openings in the end plate of the heat exchanger 14 as has been previously described herein. A hose reel assembly 234 is operatively engaged with the water jet cleaning equipment 242 and with a remote cleaning fluid supply (not shown).

The water jet cleaning equipment 242 as illustrated in FIGS. 4A and 4B may be substantially similar to the water jet cleaning equipment 242 disclosed in a patent application referenced above and incorporated herein, entitled "LANCE CLEANING SYSTEM WITH MOVABLE SUPPORT". Because the structure and operation of the lance cleaning system with movable support has been fully described in the above-referenced patent application, Applicant will not further describe this water jet cleaning equipment 242 herein except to say that in equipment 242 is operatively engaged with and operable by the programming provided in communication device 32 or communication device 44. Water jet cleaning equipment 242 includes a plurality of lances 246 that may be selectively extended outwardly for a distance beyond the support assembly 30g and into aligned tubes (not shown in FIGS. 4A and 4B but illustrated in FIGS. 2A and 2B) defined in heat exchanger 14. The various components of the lance cleaning system 242 are supported by movable platform 230j of frame 230 during operation of cleaning apparatus 222 and are stored on frame 230 when not in use.

Cleaning apparatus 222 includes various sensors that are activated and controlled by the special programming provided in the communication device 32, 44 to accurately assist in the maneuvering of the lances 246 of water jet cleaning equipment 242. To this end, cleaning apparatus 222 includes a Y-axis sensor 248, an X-axis sensor 250, and a Z-axis sensor 252 at are all operatively engaged with communication device 32, 44 and with a motor that drives movement of movable platforms 230j and a lance head 254 that supports lances 246. In particular, movable platform 230j and therefore lances 246 may be vertically raised or lowered as indicated by the arrows "K" and "L", respectively in FIGS. 4A and 4B. Lance head 254 includes slider mechanism 254a that engages platform 230j and enables lance head 254 and thereby lances 246 to be moved horizontally to the left and right along platform 230j as indicated by the arrows "M" and "N", respectively. Lances 246 may also be advanced towards or retracted away from heat exchanger 14 as indicated by the arrow "Q". The X-axis, Y-axis, and Z-axis sensors provide feedback to communication device 32, 44 as to the positioning of lances 246 in three dimensions.

After delivery of a dirty heat exchanger 14 from the transportation device 16 16 and onto the conveyor 26 (if provided), conveyor 26 is actuated by communication device 32, 44 to travel from the input end 20a towards the output end 20b. The conveyor 26 moves the dirty heat exchanger 14 to a cleaning position directly in front of the support assembly 230g of cleaning apparatus 22. The operator "P" actuates a cleaning operation using programming provided in communication device 32 or 44. When actuated by the specialized programming provided in the communication device 32 or 44, as already discussed herein, water jet cleaning equipment 242 is activated and performs the cleaning operation. The cleaned heat exchanger 14 is then moved back to plant 18 as has been described earlier herein and is reinstalled in the process performed in plant 18.

It will be understood that each type of water jet cleaning equipment disclosed herein, i.e., cleaning equipment 42, 142, 242, may initially be moved through a setup procedure. In some instances, the setup procedure is utilized to teach the programming provided in the communication device 32, 44 the pattern of tube openings 14c' defined in end plate 14c of the heat exchanger 14 that is moved into the cleaning position in front of the cleaning apparatus. The setup procedure that teaches the programming the pattern of any particular heat exchanger or tube bundle has been described in detail in a number of the patents and patent applications referenced earlier herein. The setup procedure, the learning of the pattern of tube openings 14c' and the storing of the learned pattern will therefore not described in any detail herein. In other instances, the pattern of tube openings 14c' in an end plate 14c of any particular heat exchanger 14 is provided to the computing device 32, 44 by entering or uploading the same.

In accordance with an aspect of the present disclosure, a unique identifier 14f (FIG. 2A) of some type, such as a marking or a number for example, may be provided at one or more locations on each individual heat exchanger 14. The pattern of tube openings 14c' learned through the setup procedure or that is uploaded and stored in the memory of the communication device 32, 44 is associated in a database with the unique identifier 14f of each individual heat exchanger 14. Each time a heat exchanger 14 is moved to the cleaning position in front of the cleaning apparatus 22, 222, the unique identifier 14f will be entered into the communication device 32, 44, and the associated pattern of tube openings 14*c*' will be accessed from the memory of the communication device 32, 44. As a consequence, the setup step is able to be omitted from the cleaning operation and this makes the cleaning operation more efficient. The identifier 14*f* may be manually entered into the communication device 32, 44 by the operator "P" or an optical scanner or other sensor may be provided on the cleaning apparatus 22, 222 to automatically scan the identifier 14*f* on the heat exchanger. For ease of access to the heat exchanger 14, the optical scanner may be provided at a suitable location on support assembly 30*g*, 230*g*.

Once the pattern of tube openings 14*c*' in end plate 14*c* of heat exchanger 14 is either learned or accessed, the programming of the communication device 32, 44 is utilized to manually or automatically perform a cleaning operation on the heat exchanger 14. Pumps (not shown) that are operatively engaged with the water jet cleaning apparatus 42, 142, 242, hose reel assembly 34, 234 and/or remote water source are activated, cleaning fluid is provided under pressure to the associated lances 46, 146, 246 and a high pressure jet of fluid is directed into the bore of the heat exchanger tube 14*b* with which any particular lance is aligned. The high pressure jet of cleaning fluid blasts accumulated debris from the inner surface of the tube 14*b*. The tubes 14*b* are progressively cleaned in this fashion until all of the tubes in heat exchanger 14 are substantially free of built-up materials.

As has been disclosed in the applications that are incorporated herein by reference, a user interface is provided on the computing device. In one embodiment, the user interface includes a touch screen and a plurality of selectable options provided on the user interface. At least one of the plurality of selectable options corresponds to a function to be performed by a component of the cleaning apparatus. The operator will contact the user interface and one or more movements of the operator's fingertip on the at least one of the plurality of selectable options on the touch screen controls one of the operation of the water jet cleaning apparatus and the performing of the operation with the water jet cleaning apparatus. The software provided in the computing device may include programming to learn a pattern of a plurality of spaced apart openings in the end plate of the heat exchanger. In other embodiments, software is uploaded into the computing device and the software includes the pattern of the plurality of spaced apart openings. The software also includes programming to move a nozzle of an indexer of the water jet cleaning apparatus from one of the plurality of spaced apart openings in the pattern to another of the plurality of spaced apart openings upon the operator's fingertip contact with one of the plurality of selectable options on the touch screen.

As shown in FIG. 3A, support assembly 22 includes an X-Y indexer having a first indexer rail, a second indexer rail; and a trolley engageable with the first indexer rail or the second indexer rail. The first indexer rail may be a vertically oriented rail and the second indexer rail may be a horizontally oriented rail. The vertical and horizontal rails are arranged at right angles to each other. As illustrated, the trolley is engaged with the vertically oriented rail and is operable to position at least one nozzle (on a lance 46 provided on the trolley) to deliver a water jet therefrom and into an opening defined in the end plate 14*c*. The lance 46 is operatively engaged with the support assembly 22 via the trolley and indexer rails and is connected to a remote water source 38 (FIG. 2A). The trolley is used to position the lance 46 (and the nozzle thereon) relative to the end plate of the heat exchanger.

As shown in FIG. 3*b*, support assembly 22 includes water jet cleaning equipment 142 that has a rotary arm secured by a mounting plate to one of the vertical members 30*h*, 30*h*' of the support assembly 22. Lances 146 are engaged on a trolley on the rotary arm. Lance 146 (by virtue of being engaged on the rotary arm) has at least a first degree of freedom and a second degree of freedom relative to the support assembly 22; and the programming in the computing device 32 or 44 is operable to control movement of the lance 146 relative to the support assembly 22. The first degree of freedom may be rotation of the lance 146 about an axis oriented at right angles to the rotary arm's mounting plate that is engaged with the support assembly 22. The second degree of freedom may be linear motion of the lance 146 (by virtue of the trolley's movement along the rotary arm) in one of a first direction towards the rotary arm's mounting plate on the support assembly 22 and a second direction away from the mounting plate on the support assembly.

Once the water jet cleaning equipment 42 has cleaned the heat exchanger tubes, the cleaned heat exchanger 14 is then advanced by the conveyor mechanism 26 away from in front of the cleaning apparatus 22, 222 and toward the output end 20*b* of the translation assembly 20. The gantry crane adjacent the output end 20*b* of the translation assembly 20 uses the hitch 28 to lift the cleaned heat exchanger 14 from the conveyor mechanism 26 and onto transportation device 16. The transportation device 16 moves in the direction of arrow 'E' (FIGS. 1, 1A) towards the plant 18. The cleaned heat exchanger 14 is lifted off the transportation device 16 and is moved in the direction "F" back into the plant 18 where it is re-installed into its use-position to continue performing its function in the plant It will be understood that while in the first embodiment of the cleaning system 10, a translation assembly 20 is provided that progressively moves the heat exchangers 14 offloaded from the transportation device 16 to a cleaning position in front of the support assembly 30*g* of the cleaning apparatus 22, in other embodiments, the translation assembly 20 will simply comprise two spaced apart rails 24*a*, 24*b* that support the heat exchangers 14. No conveyor 26 is provided in this instance. The plurality of heat exchangers 14 are offloaded onto the rails 24*a*, 24*b* and are placed at spaced-apart intervals relative to each other and in a correct orientation to be cleaned. A movable cleaning apparatus (i.e., a cleaning apparatus 22, 222 on wheels or tracks) is then selectively moved parallel to the longitudinal axes of the rails 24*a*, 24*b*. The movable cleaning apparatus will be progressively moved to in front of each of the spaced-apart heat exchangers supported on the rails 24*a*, 24*b*. A cleaning operation is initiated using the computing device 32, 44 when the water jet cleaning equipment provided on the cleaning apparatus is in the correct position to perform the cleaning operation. In this alternative embodiment, the cleaning apparatus may be slidably mounted on rails that are parallel to the rails 24*a*, 24*b* and the programming in the computing device 32, 44 will automatically move the cleaning apparatus from one pre-set position to the next to perform a cleaning operation.

It will be understood that the cleaning fluid provided by the remote water or cleaning fluid source and utilized by cleaning apparatus 22, 222 may be water or it may be any other suitable type of cleaning fluid known in the art. The water-jet cleaning equipment may therefore deliver a high pressure jet of water or a high pressure jet of any other suitable cleaning fluid during a cleaning operation.

It will further be understood that the cleaning operation may be performed under manual control of the operator "P"

through the operator's interaction with a user interface of the computing device 32, 44, as has been described in the various patents and patent applications incorporated herein by reference.

It will further be understood that in other instances, the cleaning operation may be automatically after initiation of the programming by the operator "P" interacting with a user interface of the computing device 32, 44, as has been described in the various patents and patent applications incorporated herein by reference.

In summary, a method of cleaning tubes 14b of a heat exchanger 14 in accordance with the present disclosure comprises disengaging a dirty heat exchanger 14 (or a dirty tube bundle and end plate) from a use-position in a process or a plant 18. The term "dirty" is used to describe a heat exchanger 14 that has sufficient build-up on the interior surfaces of the tubes 14b that defines the bores therein that the heat exchanger 14 needs to be cleaned using high pressure jets of cleaning fluid.) The method further includes moving the dirty heat exchanger 14 or the dirty tube bundle to a cleaning station 12 that is located remote from the use-position in the plant 18. In other words, heat exchanger 14 or the tube bundle is not cleaned in situ at its in use-position in the plant or process. The method further includes positioning the dirty heat exchanger 14 or the tube bundle in front of a cleaning apparatus 22 at the cleaning station 12; providing water jet cleaning equipment 42 on a support assembly 30g of the cleaning apparatus 22; responding to programming in a computing device 32, 44 and controlling the water jet cleaning equipment 42 and a cleaning operation using the water jet cleaning equipment 42 with the programming; providing a pattern of tube openings 14c defined in an end plate 14c of the dirty heat exchanger 14 or the dirty tube bundle to the computing device 32, 44. An exemplary pattern of the openings 14c to the tubes 14b of the heat exchanger 14 is shown in FIGS. 2A and 2B. Various other patterns of tube openings in end plates of heat exchangers are shown and described in the various patents and patent applications incorporated herein by reference. The pattern may be learned by the computing device and stored in the memory thereof or the pattern may be uploaded or otherwise given to the computing device. The programming is configured to follow the learned or uploaded pattern during the performing of the cleaning operation. The method in accordance with the present disclosure further includes actuating the water jet cleaning equipment 42 with the computing device 32, 44 (when the operator "P" is sitting in the cab 30d of the cleaning apparatus 22 or is standing in the general proximity of the cleaning apparatus 22. It will be understood the operator "P" is able to control the water jet cleaning equipment 22 and all other pieces of equipment that move the heat exchanger 14 or tube bundle into the correct position and/or that make the water jet cleaning equipment 22 capable of performing a cleaning operation using the computing device 32, 44. It will further be understood that in other instances, instead of the operator "P" being located on cleaning apparatus 22 or in the vicinity thereof, the operator "P" may be located a distance away from the cleaning apparatus 22 and/or the plant and will utilize the same LUNCH BOX™ programming in a computing device to control the various pieces of equipment and the cleaning operation. The method in accordance with the present disclosure further includes performing a cleaning operation of the heat exchanger 14 or the tube bundle with the water jet cleaning equipment 22 under the control of the programming of the computing device 32, 44 and by following the provided pattern of tube openings 14c'.

The method further comprises moving the cleaned heat exchanger 14 or the cleaned tube bundle from the cleaning station 12 back to the use-position at the plant or process 18; and reengaging the heat exchanger 14 or the tube bundle in the use-position in the process or the plant 18. The cleaning operation is performed either under manual control of an operator "P" through interaction with the computing device 32, 44 or the cleaning operation is automatically performed after initiation of the programming in the computing device 32, 44 by an operator "P" interacting with the computing device 32, 44.

The moving of the dirty heat exchanger 14 or the dirty tube bundle from the process or plant 18 to the cleaning station 12 includes placing the heat exchanger 14 or the tube bundle on a transportation device 16; and moving the transportation device from the process or plant 18 to the cleaning station 12. The moving of the heat exchanger 14 or the tube bundle from the process or plant 18 to the cleaning station 12 further comprises moving the heat exchanger 14 or the tube bundle from the transportation device 16 to a translation assembly 20; activating the translation assembly 20; and moving the heat exchanger 14 or the tube bundle with the translation assembly 20 from an input end 20a of the translation assembly 20 to a location directly in front of the cleaning apparatus 22.

In the method, the providing of the pattern of tube openings 14c' in the end plate 14c includes learning, with the programming provided in the computing device 32, 44, the pattern of tube openings 14c' defined in the end plate 14c of the heat exchanger 14 or the tube bundle. The learning is followed by storing, in a memory of the computing device 32, 44, the learned pattern of tube openings 14c'.

The method according to the present disclosure may also include providing a unique identifier 14f on the heat exchanger 14 or the tube bundle; associating the pattern of tube openings 14c' with the unique identifier 14f; and storing, in a memory of the computing device 32, 44, the associated pattern of tube openings 14c' and the unique identifier 14f. The method according to the present disclosure may also include disengaging the heat exchanger 14 or the tube bundle with the unique identifier 14f from the process or plant 18 at a later time period; moving the heat exchanger 14 or the tube bundle with the unique identifier 14f from the process or plant 18 to the cleaning apparatus 22; entering the unique identifier 14f into a user interface (e.g. touchscreen) of the computing device 32, 44; retrieving the stored pattern of tube openings 14c' associated with the unique identifier 14f from the memory of the computing device 32, 44; and performing a second cleaning operation of the heat exchanger 14 or tube bundle by following the retrieved pattern of tube openings 14c' with a lance 46 of the water jet cleaning equipment 42.

The method according to the present disclosure may also include cleaning a plurality of different heat exchangers 14 or the tube bundles at the cleaning station 12; providing the pattern of tube openings 14c' for each of the plurality of different heat exchangers 14 or the tube bundles to the computing device 32, 44; associating a different and unique identifier (such as unique identifier 14f) with each one of the plurality of different heat exchangers 14 or tube bundles; 3 storing, in the memory of the computing device 32, 44, the associated different and unique identifiers (such as unique identifier 14f) with a different provided pattern of tube openings 14c'; providing the unique identifier for a particular one of the plurality of different heat exchangers 14 or tube bundles to the computing device 32, 44; retrieving the associated pattern of tube openings 14c' from the memory of the computing device 32, 44; and performing the cleaning operation utilizing the retrieved pattern of tube openings 14c'.

The providing of the unique identifier 14f to the computing device 32, 44 includes one of entering the unique identifier 14f into a user interface (such as a touchscreen) of the computing device 32, 44 and scanning the unique identifier 14f provided on an exterior surface of the heat exchanger 14 or the tube bundle.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computing device or distributed among multiple computing devices. Furthermore, the instructions or software code can be stored in at least one non-transitory computing device readable storage medium.

Also, a computing device or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Such computing devices or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computing device readable storage medium (or multiple computing device readable storage media) (e.g., a computing device memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computing device storage medium) encoded with one or more programs that, when executed on one or more computing devices or other processors, perform methods that implement the various embodiments of the disclosure discussed above. The computing device readable medium or media can be transportable, such that the program or programs stored thereon can be loaded onto one or more different computing devices or other processors to implement various aspects of the present disclosure as discussed above.

The terms "program" or "software" or "instructions" are used herein in a generic sense to refer to any type of computing device code or set of computing device-executable instructions that can be employed to program a computing device or other processor to implement various aspects of embodiments as discussed above. Additionally, it should be appreciated that according to one aspect, one or more computing device programs that when executed perform methods of the present disclosure need not reside on a single computing device or processor, but may be distributed in a modular fashion amongst a number of different computing devices or processors to implement various aspects of the present disclosure.

Computing device-executable instructions may be in many forms, such as program modules, executed by one or more computing devices or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computing device-readable media in any suitable form. For simplicity of illustration, data structures may be shown to have fields that are related through location in the data structure. Such relationships may likewise be achieved by assigning storage for the fields with locations in a computing device-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computing device-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computing device implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A method of cleaning heat exchangers or tube bundles comprising:
    providing a cleaning station at a set location remote from a use-position of one or more heat exchangers or tube bundles in a process or a plant, wherein the cleaning station includes water jet cleaning equipment and a control station for controlling the water jet cleaning equipment;
    disengaging a heat exchanger or a tube bundle from its use-position in a process or a plant;
    transporting the heat exchanger or the tube bundle from its use-position in the process or the plant to the set location of the cleaning station;
    positioning the heat exchanger or the tube bundle in front of the water jet cleaning equipment at the cleaning station;
    responding to programming in a computing device operatively engaged with the water jet cleaning equipment and controlling the water jet cleaning equipment and a cleaning operation using the water jet cleaning equipment;
    actuating the water jet cleaning equipment with the computing device; and
    performing the cleaning operation of the heat exchanger or the tube bundle with the water jet cleaning equipment under control of the programming of the computing device and by following a provided pattern of tube openings defined in an end plate of the heat exchanger or the tube bundle.

2. The method according to claim 1 wherein disengaging the heat exchanger or the tube bundle from its use position further comprises disengaging a plurality of heat exchangers or tube bundles from their individual use-positions in the process or plant, and transporting the plurality of heat exchangers or tube bundles to the remote cleaning station.

3. The method according to claim 2, further comprising:
    placing each of the plurality of heat exchangers or tube bundles onto a translation assembly; and
    sequentially cleaning the plurality of heat exchangers with the water jet equipment while on the translation assembly.

4. The method according to claim 3, further comprising:
    activating the translation assembly after the plurality of heat exchangers or tube bundles are placed thereupon;
    sequentially moving the plurality of heat exchangers or tube bundles via the translation assembly from a first position remote from the water jet equipment to a second position in front of the water jet equipment; and performing the cleaning operation on an individual heat exchanger or a tube bundle while at the second position.

5. The method according to claim 4, further comprising:
sequentially moving each cleaned heat exchanger or tube bundle on the translation assembly from the second position in front of the water jet equipment to a third position remote from the second position and remote from the first position.

6. The method according to claim 5, further comprising:
sequentially removing the cleaned plurality of heat exchangers or tube bundles from the translation assembly when at the third position; and
returning the cleaned plurality of heat exchangers or tube bundles back to their individual use-positions in the process or plant.

7. The method according to claim 3, further comprising:
providing a unique identifier on each of the plurality of heat exchangers or tube bundles;
associating a pattern of tube openings in an end plate of each of the plurality of heat exchangers or tube bundles with the unique identifier for an individual heat exchanger or tube bundle of the plurality of heat exchangers or tube bundles; and
storing, in a memory of the computing device, the associated pattern of tube openings and the unique identifier for each individual heat exchanger or tube bundle.

8. The method according to claim 7, further comprising:
retrieving the stored associated pattern of tube openings associated with the unique identifier of the individual heat exchanger or tube bundle from the memory of the computing device when the individual heat exchanger or tube bundle is moved to a cleaning position in front of the water jet cleaning equipment.

9. The method according to claim 8, wherein providing of the unique identifier to the computing device includes one of entering the unique identifier into a user interface of the computing device and scanning the unique identifier provided on an exterior surface of the individual heat exchanger or tube bundle.

10. The method according to claim 1, further comprising:
providing a pattern of tube openings defined in an end plate of an individual heat exchanger or tube bundle to the computing device when that individual heat exchanger or tube bundle is located in front of the water jet cleaning equipment.

11. The method according to claim 10, further comprising:
providing a different pattern of tube openings defined in an end plate of a subsequent individual heat exchanger or tube bundle to the computing device when the subsequent heat exchanger or tube bundle is moved to a cleaning position in front of the water jet cleaning equipment.

12. The method according to claim 10, wherein the providing of the pattern of tube openings includes:
learning, with the programming provided in the computing device, the pattern of tube openings defined in the end plate of the individual heat exchanger or tube bundle located in front of the water jet cleaning equipment; and
storing, in a memory of the computing device, the learned pattern of tube openings.

13. A cleaning station for cleaning heat exchanger or tube bundles comprising:

a cleaning apparatus provided at a set location remote from a use-position of a plurality of heat exchangers or tube bundles in a plant or process, wherein the cleaning apparatus includes:
a support assembly;
a translation assembly configured to receive one or more of the plurality of heat exchangers or tube bundles thereon and to move them between a first position remote from the support assembly and a second position in front of the support assembly,
water jet cleaning equipment mounted on the support assembly, wherein said water jet cleaning equipment is adapted to be operatively engaged with a supply of cleaning fluid, and wherein said water jet cleaning equipment is configured to deliver a high pressure jet of cleaning fluid therefrom; and
a computing device provided with programming to control the water jet cleaning equipment and to control a performance of a cleaning operation with the water jet cleaning equipment.

14. The cleaning station according to claim 13, wherein the programming of the computing device is configured to follow a pattern of tube openings to tubes provided in an individual heat exchanger or tube bundle when moved to the second position for cleaning.

15. The cleaning station according to claim 14, wherein the programming of the computing device is configured to control a lance of the water jet cleaning equipment to follow the pattern of tube openings.

16. The cleaning station according to claim 15, further comprising:
a lance provided on the water jet cleaning equipment and adapted to be connected to a remote cleaning fluid source;
wherein the lance has at least a first degree of freedom and a second degree of freedom relative to the support assembly; and
wherein the programming in the computing device is operable to control movement of the lance relative to the support assembly.

17. The cleaning station according to claim 16, wherein the first degree of freedom is rotation of the lance about an axis oriented at right angles to a mounting plate secured to the support assembly.

18. The cleaning station according to claim 17, wherein the second degree of freedom is linear motion of the lance in one of a first direction towards the mounting plate and a second direction away from the mounting plate.

19. A system for cleaning one or more heat exchangers or tube bundles, said system comprising:
a cleaning station provided at a location remote from a use-position of one or more heat exchangers to tube bundles in a plant or process;
water jet cleaning equipment provided at the cleaning station, said water jet cleaning equipment installed on a support assembly;
a control center having a computing device provided with programming to control the water jet cleaning equipment and to control a performance of a cleaning operation using the water jet cleaning equipment;
at least one transportation device configured to move the one or more heat exchangers or tube bundles from the remote location to an unloading position proximate the cleaning station, and, after the cleaning operation has been performed, to move the one or more heat exchangers or tube bundles back to the remote location for reinstallation in their use-position; and a translation assembly configured to move the one or more heat exchangers or tube bundles from the unloading position to a cleaning position in front of the support assembly.

20. The system according to claim 19, wherein the translation assembly is further configured to move the one or more heat exchangers or tube bundles from the cleaning position to a loading position for the at least one transportation device to take the one or more heat exchangers from the cleaning station back to their use-position in the plant or process.

\* \* \* \* \*